United States Patent
Enami

(10) Patent No.: US 8,982,341 B2
(45) Date of Patent: Mar. 17, 2015

(54) LIGHT DISTRIBUTION CHARACTERISTIC MEASUREMENT APPARATUS AND LIGHT DISTRIBUTION CHARACTERISTIC MEASUREMENT METHOD

(71) Applicant: Otsuka Electronics Co., Ltd., Hirakata-shi (JP)

(72) Inventor: Yoshi Enami, Ritto (JP)

(73) Assignee: Otsuka Electronics Co., Ltd., Hirakata-Shi (JP)

( * ) Notice: Subject to any disclaimer, the term of this patent is extended or adjusted under 35 U.S.C. 154(b) by 0 days.

(21) Appl. No.: 13/970,607

(22) Filed: Aug. 20, 2013

(65) Prior Publication Data

US 2014/0055779 A1 Feb. 27, 2014

(30) Foreign Application Priority Data

Aug. 23, 2012 (JP) ................ 2012-184255

(51) Int. Cl.
*G01J 1/02* (2006.01)
*G01J 1/42* (2006.01)

(52) U.S. Cl.
CPC ............ *G01J 1/4257* (2013.01); *G01J 1/0242* (2013.01); *G01J 2001/4247* (2013.01)
USPC ............................. 356/121; 356/218; 356/226

(58) Field of Classification Search
USPC .................... 356/121, 213, 218, 226
See application file for complete search history.

(56) References Cited

U.S. PATENT DOCUMENTS

| | | | | |
|---|---|---|---|---|
| 5,253,036 A | * | 10/1993 | Ashdown ................ | 356/121 |
| 5,914,777 A | * | 6/1999 | Imura ..................... | 356/121 |
| 7,256,880 B2 | * | 8/2007 | Binder et al. .......... | 356/121 |
| 2008/0304049 A1 | * | 12/2008 | Pan ......................... | 356/73 |
| 2009/0185173 A1 | * | 7/2009 | Ashdown et al. ...... | 356/121 |
| 2010/0328672 A1 | * | 12/2010 | Mou ....................... | 356/446 |
| 2012/0081700 A1 | * | 4/2012 | Kuo ....................... | 356/222 |
| 2012/0194820 A1 | | 8/2012 | Kuo | |

FOREIGN PATENT DOCUMENTS

| | | |
|---|---|---|
| ES | 2187384 | 6/2003 |
| JP | 62-250325 | 10/1987 |
| JP | 09-203691 | 8/1997 |
| JP | 2001-174251 | 6/2001 |
| JP | 2003-247888 | 9/2003 |

OTHER PUBLICATIONS

Extended European Search Report for corresponding EP Application No. 13181156.4-1562, Jan. 2, 2014.

* cited by examiner

*Primary Examiner* — Hoa Pham
(74) *Attorney, Agent, or Firm* — Mori & Ward, LLP

(57) ABSTRACT

A light distribution characteristic measurement apparatus includes: a detecting unit for detecting light from a light source; a mirror for reflecting the light from the light source to direct the light to the detecting unit; a movement mechanism for moving the detecting unit and the mirror relatively to the light source; a rotation mechanism for rotating the mirror while maintaining an optical path length from the light source to the detecting unit; and a processor adapted to calculate the light distribution characteristic of the light source, based on a plurality of measurement results that are detected by the detecting unit under a condition that the detecting unit and the mirror are arranged at a plurality of measurement positions relative to the light source and the mirror is oriented at different rotational angles for each measurement position.

12 Claims, 32 Drawing Sheets

(a)

(b)

DIAGRAMMATIC REPRESENTATION OF STORAGE OF LIGHT DISTRIBUTION DATA

X-Y COORDINATE SYSTEM

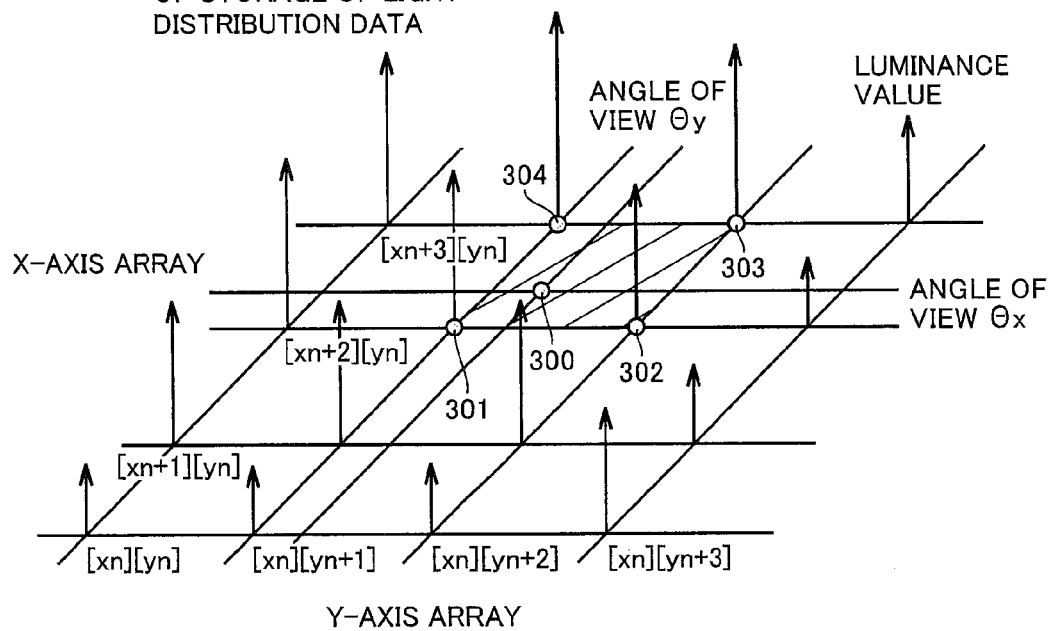
FIG.26 DIAGRAMMATIC REPRESENTATION OF STORAGE OF LIGHT DISTRIBUTION DATA

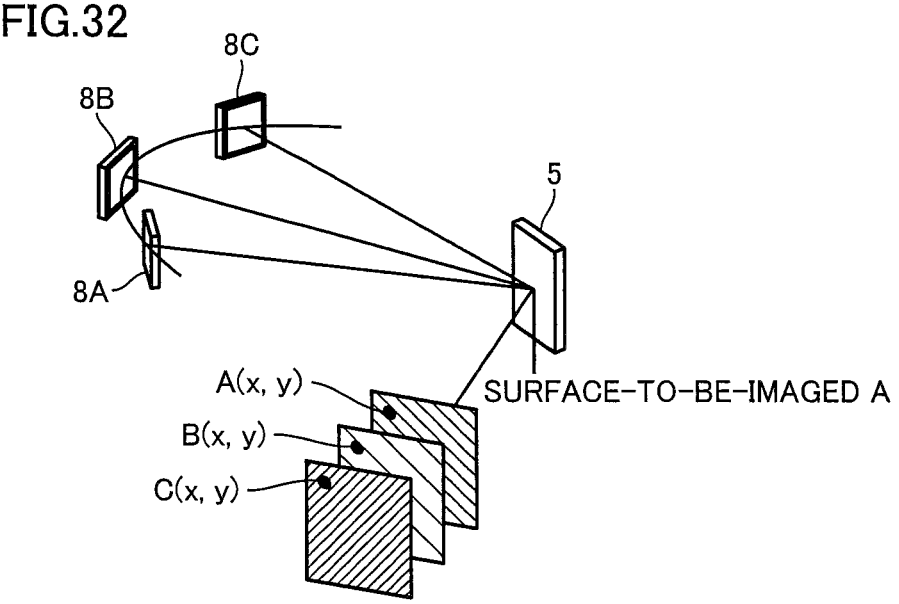

LIGHT DISTRIBUTION CHARACTERISTIC MEASUREMENT APPARATUS AND LIGHT DISTRIBUTION CHARACTERISTIC MEASUREMENT METHOD

BACKGROUND OF THE INVENTION

1. Field of the Invention

The present invention relates to a light distribution characteristic measurement apparatus and a light distribution characteristic measurement method for measuring the light distribution characteristic of a light source.

2. Description of the Background Art

The light distribution characteristic is known as one of the characteristics of light emitted from a light source. The light distribution characteristic means a spatial distribution of the luminous intensity (or luminance) of a light source. As such a light distribution characteristic, both the absolute-value-based light distribution and the relative-value-based light distribution are used. The absolute-value-based light distribution is a measurement of the spatial distribution of the absolute value of the luminous intensity and is used in such a case where the total luminous flux generated by a light source is to be determined. In contrast, the relative-value-based light distribution is a measurement of the spatial distribution of the relative value of the luminous intensity, and is used in such a case where the light distribution pattern is to be determined. Generally, it is not easy to measure the light distribution characteristic of light sources such as a light source having a complicated light distribution pattern and a light source whose characteristics are not known. Regarding the method and apparatus for measuring such light distribution characteristics, the following related arts are known.

Japanese Patent Laying-Open No. 62-250325 discloses a light distribution measurement apparatus based on a system in which an object to be measured is fixed, a mirror is revolved around the object, and the light reflected from the mirror is measured with an optical receiver.

Japanese Patent Laying-Open No. 2003-247888 discloses a light distribution measurement device including a first rotating stage which is rotatable about a first rotational axis, a second rotating stage which is rotatable about a second rotational axis orthogonal to the first rotational axis and held on the first rotational stage in such a manner that the second rotating stage is spaced from the first rotational axis, and a light source provided so that the center of its light emission surface is located at the intersection of the first and second rotational axes.

Japanese Patent Laying-Open No. 09-203691 discloses a method for measuring a light distribution pattern or the like. Specifically, a light receiving unit in which a plurality of optical receivers are arranged linearly at predetermined intervals is moved in front of a source of irradiation and along the direction orthogonal to the direction along which the optical receivers are arranged, to thereby measure the light distribution pattern.

Japanese Patent Laying-Open No. 2001-174251 discloses a measurement apparatus including a first unit enabling an object-to-be-measured to perform a vertical linear operation and a horizontal rotational operation, and a second unit causing a measurement device to perform a horizontal linear operation, a vertical linear operation, and a revolving operation revolving on a plane defined by these two directions.

Possible light sources whose light distribution characteristic is to be measured range from a small lamp like mini light bulb to a large lamp like vehicle's headlight. In the case where the light distribution characteristic of a light source having a relatively large light emission surface is to be measured, it is necessary that the distance between a detecting unit and the light source (measurement distance) be sufficiently long for the detecting unit to have its field of view which is large enough to encompass the whole light source therein. The above-described related arts have confronted a problem of increased complexity and increased size of an apparatus in the case where the apparatus is designed to measure the light distribution characteristic of a light source whose light emission surface is relatively large.

SUMMARY OF THE INVENTION

Thus, there has been a demand for a light distribution characteristic measurement apparatus capable of efficiently measuring the light distribution characteristic of a light source without increase in apparatus configuration as well as a light distribution characteristic measurement method appropriate for this apparatus.

In accordance with an embodiment of the present invention, there is provided a light distribution characteristic measurement apparatus for measuring a light distribution characteristic of a light source. The light distribution characteristic measurement apparatus includes: a detecting unit for detecting light from the light source; a mirror for reflecting the light from the light source to direct the light to the detecting unit; a movement mechanism for moving the detecting unit and the mirror relatively to the light source; a rotation mechanism for rotating the mirror while maintaining an optical path length from the light source to the detecting unit; and a processor adapted to calculate the light distribution characteristic of the light source, based on a plurality of measurement results that are detected by the detecting unit under a condition that the detecting unit and the mirror are arranged at a plurality of measurement positions relative to the light source and the mirror is oriented at different rotational angles for each measurement position.

Preferably, the rotation mechanism is adapted to control the rotational angle of the mirror in such a manner that a field of view of the detecting unit when the mirror is oriented at a first rotational angle and a field of view of the detecting unit when the mirror is oriented at a second rotational angle do not overlap each other.

Preferably, the processor is adapted to calculate an angle of view of the detecting unit with respect to the light source, in connection with a rotational angle of the mirror.

Preferably, the light distribution characteristic measurement apparatus further includes a lens for adjusting a focal point of the detecting unit on a light emission surface of the light source.

Preferably, the detecting unit and the mirror are configured to be rotatable integrally with each other about a first axis and a second axis whose intersection corresponds to the center of the light source, and the rotation mechanism is adapted to rotate the mirror about an axis at least parallel to one of the first and second axes.

Preferably, the light distribution characteristic measurement apparatus further includes a second mirror placed on an optical path from the mirror to the detecting unit.

Preferably, the detecting unit includes a plurality of detecting surfaces arranged in accordance with a predetermined rule, with respect to a rotational center of the mirror.

More preferably, the rotation mechanism is adapted to rotate the mirror by an angle at each movement that is a half of an angle formed by two adjacent detecting surfaces with respect to the rotational center of the mirror.

In accordance with another embodiment of the present invention, there is provided a light distribution characteristic measurement method for measuring a light distribution characteristic of a light source. The light distribution characteristic measurement method includes the steps of: moving a detecting unit for detecting light from the light source and a mirror for reflecting the light from the light source to direct the light to the detecting unit, relatively to the light source, to arrange the detecting unit and the mirror at a plurality of measurement positions relative to the light source; orienting the mirror at different rotational angles for each measurement position while maintaining an optical path length from the light source to the detecting unit; and calculating the light distribution characteristic of the light source, based on a plurality of measurement results detected by the detecting unit.

Preferably, the step of rotating includes the step of controlling the rotational angle of the mirror in such a manner that a field of view of the detecting unit when the mirror is oriented at a first rotational angle and a field of view of the detecting unit when the mirror is oriented at a second rotational angle do not overlap each other.

Preferably, the step of calculating includes the step of calculating an angle of view of the detecting unit with respect to the light source, in connection with a rotational angle of the mirror.

Preferably, the detecting unit and the mirror are configured to be rotatable integrally with each other about a first axis and a second axis whose intersection corresponds to the center of the light source, and the step of rotating includes the step of rotating the mirror about an axis at least parallel to one of the first and second axes.

Preferably, the detecting unit includes a plurality of detecting surfaces arranged in accordance with a predetermined rule, with respect to a rotational center of the mirror.

More preferably, the step of rotating includes the step of rotating the mirror by an angle at each movement that is a half of an angle formed by two adjacent detecting surfaces with respect to the rotational center of the mirror.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 26 is a diagram for explaining a process of searching for the luminance at the angle of view shown in FIG. 23.

FIG. 32 is a diagram for explaining an example configuration where the chromaticity is calculated by means of a light distribution characteristic measurement apparatus in a modification of the present embodiment.

DESCRIPTION OF THE PREFERRED EMBODIMENTS

Figure 1:
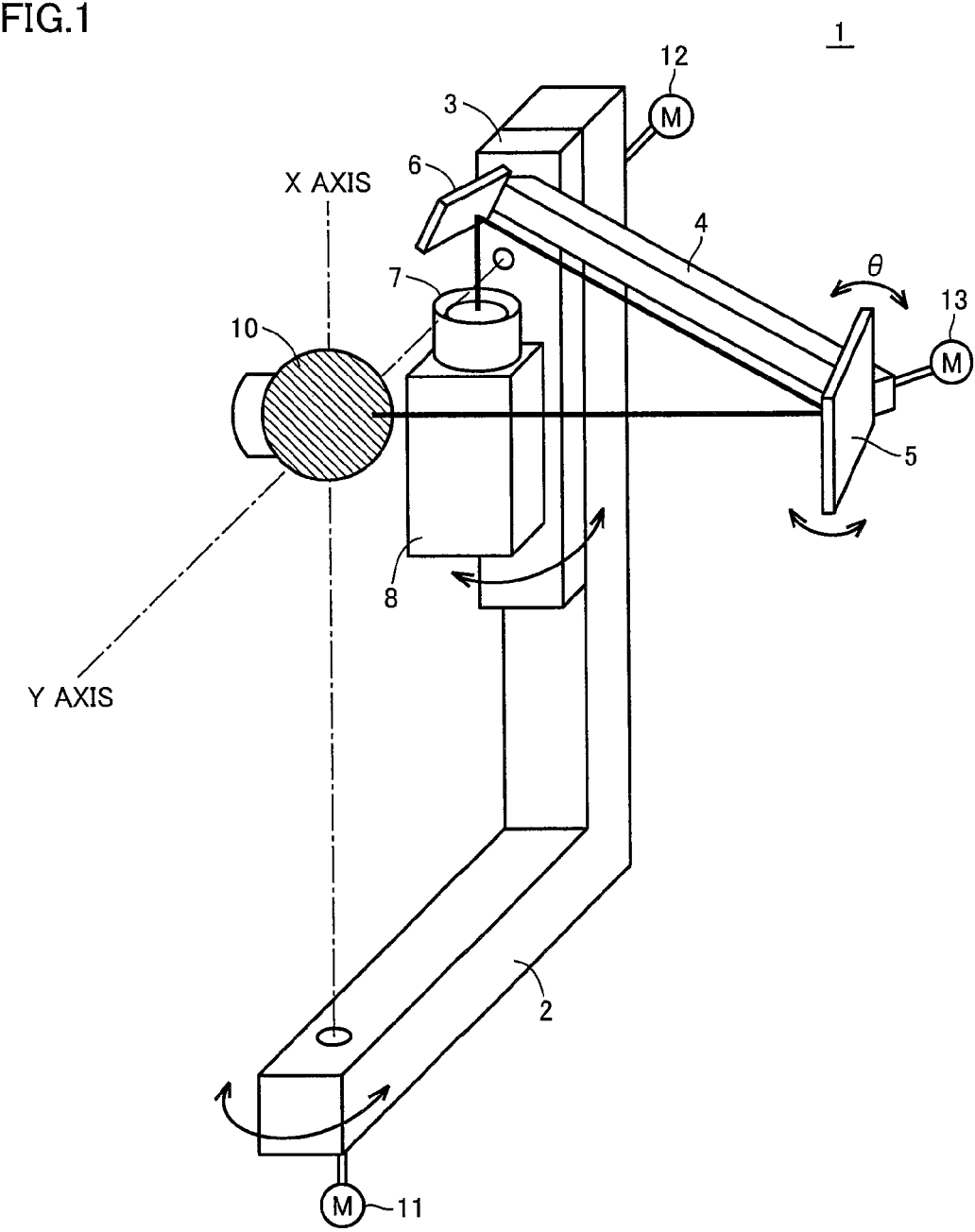
FIG. 1 is a schematic diagram showing an overall configuration of a light distribution characteristic measurement apparatus in an embodiment.

An embodiment of the present invention will be described in detail with reference to the drawings. In the drawings, the same or corresponding components are denoted by the same reference characters, and a description thereof will not be repeated.

In connection with the present embodiment, a light distribution characteristic measurement apparatus for measuring the light distribution characteristic (typically luminance distribution characteristic) of a sample light source (hereinafter also referred to simply as "light source") will chiefly be illustrated by way of example. It should be noted that the light distribution characteristic measurement apparatus in the present embodiment is capable of measuring not only the mere light distribution characteristic but also a variety of optical characteristics, which are calculated from the light distribution characteristic, such as light source's chromaticity and wavelength information as well as the total luminous flux emitted from the light source. The light distribution characteristic measurement apparatus in the present embodiment is applicable for example to measurement of the light distribution characteristic of a lighting device, illuminance test on a lamp, measurement of the viewing angle characteristic of a display, and the like.

<A. Apparatus Configuration of Light Distribution Characteristic Measurement Apparatus>

First, an apparatus configuration of a light distribution characteristic measurement apparatus in the present embodiment will be described. The light distribution characteristic measurement apparatus in the present embodiment chiefly measures the near-field light distribution characteristic of a light source. As will be described later herein, the near-field light distribution characteristic indicates in which direction and with which intensity light is emitted from each position on a light emission surface of a light source.

FIG. 1 is a schematic diagram showing an overall configuration of light distribution characteristic measurement apparatus 1 in the present embodiment. Referring to FIG. 1, light distribution characteristic measurement apparatus 1 has a goniometer capable of revolving around a light source 10, or a mechanism of a similar kind. Specifically, light distribution characteristic measurement apparatus 1 includes an L-shaped base 2 arranged rotatably about an X axis, and a support 3 coupled to one side of base 2 and arranged rotatably about a Y axis which is orthogonal to the X axis. Light source 10 is arranged so that its center is located at the intersection of the X axis and the Y axis.

On support 3, a detecting unit 8 for detecting light from light source 10 is placed. On a light-incidence side of detecting unit 8, a lens 7 is placed. On support 3, a rotational plane mirror 5 is further placed through an arm 4. Rotational plane mirror 5 reflects (folds back) the light emitted from light source 10 to direct the light to detecting unit 8. Rotational plane mirror 5 is configured to be rotatable about a point on arm 4 while maintaining the optical path length from light source 10 to detecting unit 8. Namely, rotational plane mirror 5 is arranged rotatably within a predetermined angular range about an axis that is parallel to the X axis and/or the Y axis. Rotational plane mirror 5 can rotate to thereby change the field of view of detecting unit 8.

Although the light emitted from light source 10 may be reflected by rotational plane mirror 5 so that the light is guided directly to detecting unit 8, the configuration shown in FIG. 1 includes a stationary plane mirror 6 (second mirror) placed on the optical path from rotational plane mirror 5 to detecting unit 8. Use of stationary plane mirror 6 enables detecting unit 8 to be placed along the longitudinal direction of support 3 and accordingly enables the apparatus to further be downsized. In addition, the light from light source 10 can be reflected by each of rotational plane mirror 5 and stationary plane mirror 6 to thereby make the light unpolarized that is to enter detecting unit 8.

In light distribution characteristic measurement apparatus 1, base 2 rotates about the X axis and support 3 rotates about the Y axis, and accordingly detecting unit 8 and rotational plane mirror 5 placed on arm 4 move relatively to light source 10. Namely, detecting unit 8 and rotational plane mirror 5 are configured to be rotatable integrally with each other about the X axis (first axis) and the Y axis (second axis) whose intersection corresponds to the center of light source 10. Stationary plane mirror 6 rotates about an axis at least parallel to one of the X axis (first axis) and the Y axis (second axis). Regarding a typical embodiment described below, a configuration where stationary plane mirror 6 rotates about an axis parallel to the Y axis will be illustrated.

Light distribution characteristic measurement apparatus 1 further includes an X-axis motor 11 for rotating base 2 about the X axis and a Y-axis motor 12 for rotating support 3 about the Y axis. Namely, X-axis motor 11 for rotating base 2 about the X axis, Y-axis motor 12 for rotating support 3 about the Y axis, and a computer (described later herein) controlling these motors correspond to a movement mechanism for causing detecting unit 8 and rotational plane mirror 5 to move relatively to light source 10.

This movement mechanism is used to set detecting unit 8 and rotational plane mirror 5 at a plurality of measurement positions with respect to light source 10. Detecting unit 8 and rotational plane mirror 5 are thus arranged at a plurality of measurement positions so that the surface luminances (illuminances) of light source 10 as viewed at different angles of incidence respectively are measured.

Light distribution characteristic measurement apparatus 1 further includes a rotational-mirror motor 13 for rotating rotational plane mirror 5 about an axis that is parallel to the X axis and/or the Y axis. Namely, rotational-mirror motor 13 and a computer (described later herein) controlling rotational-mirror motor 13 correspond to a rotation mechanism for rotating rotational plane mirror 5 while keeping the optical path length from light source 10 to detecting unit 8. For each measurement position, light distribution characteristic measurement apparatus 1 orients rotational plane mirror 5 by different rotational angles to thereby obtain a plurality of measurement results. These measurement results are obtained respectively from different fields of view of detecting unit 8 with respect to light source 10. Namely, the rotation mechanism controls the rotational angle of rotational plane mirror 5 in such a manner that a field of view of detecting unit 8 when rotational plane mirror 5 is oriented at a certain rotational angle (first rotational angle) and a field of view of detecting unit 8 when rotational plane mirror 5 is oriented at a subsequent rotational angle (second rotational angle) do not overlap each other.

Based on these plurality of measurement results obtained from each measurement position, light distribution characteristic measurement apparatus 1 calculates the light distribution characteristic of light source 10. This calculation is implemented by a computer functioning as a processor. Namely, detecting unit 8 and rotational plane mirror 5 are arranged at a plurality of measurement positions with respect to light source 10 and, for each measurement position, rotational plane mirror 5 is oriented at different angles. Accordingly, a plurality of measurement results are detected by detecting unit 8. Based on these results, the computer calculates the light distribution characteristic of light source 10.

Detecting unit 8 may be any of a point sensor, a one-dimensional sensor, and a two-dimensional sensor. As the point sensor, typically a photodetector such as diode is used. As the one-dimensional sensor, typically a line sensor having a plurality of linearly-arranged photodetectors, or the like is used. As the two-dimensional sensor, typically an area sensor such as CCD (Charge Coupled Device) image sensor or CMOS (Complementary Metal Oxide Semiconductor) image sensor is used. As will be described later herein, depending on the type of detecting unit 8 (namely the size of its detecting surface), the rotational amount or the like of rotational plane mirror 5 is optimized.

<B. Electrical Configuration of Light Distribution Characteristic Measurement Apparatus 1>

Next, an electrical configuration of light distribution characteristic measurement apparatus 1 in the present embodiment will be described.

<<b1: Electrical Configuration of Whole Light Distribution Characteristic Measurement Apparatus 1>>

Figure 2:
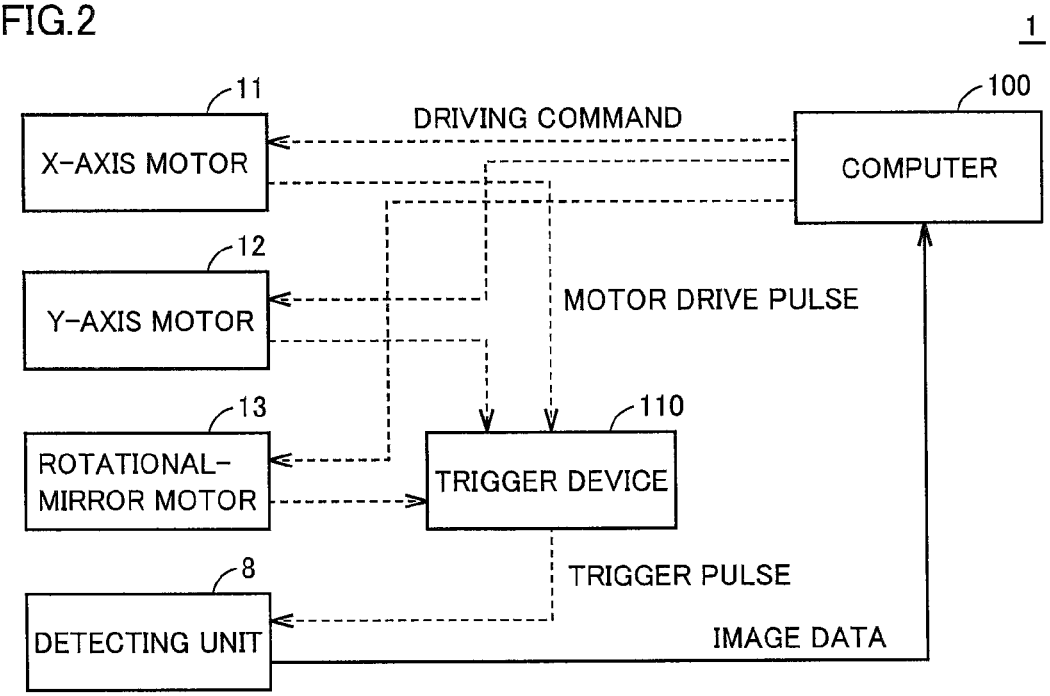
FIG. 2 is a schematic diagram showing an electrical configuration of the light distribution characteristic measurement apparatus in the present embodiment.

FIG. 2 is a schematic diagram showing an electrical configuration of light distribution characteristic measurement apparatus 1 in the present embodiment. Referring to FIG. 2, light distribution characteristic measurement apparatus 1 includes a computer 100 and a trigger device 110, in addition to X-axis motor 11, Y-axis motor 12, rotational-mirror motor 13, and detecting unit 8.

Computer 100 has a capability of controlling the movement mechanism of light distribution characteristic measurement apparatus 1 as well as a capability of processing image data obtained through imaging by detecting unit 8. Trigger device 110 manages the timing of imaging by detecting unit 8, in accordance with the position of detecting unit 8 and rotational plane mirror 5 relative to light source 10 as well as the rotational angle of rotational plane mirror 5. Although the capability offered by trigger device 110 may be incorporated in computer 100, it is preferable to arrange trigger device 110 including a dedicated hardware circuit, separately from computer 100, in order to more accurately control the imaging timing (imaging position).

More specifically, computer 100 transmits driving commands to X-axis motor 11, Y-axis motor 12, and rotational-mirror motor 13, respectively. These driving commands include instructions about the speed of movement and/or the target position, to X-axis motor 11, Y-axis motor 12, and rotational-mirror motor 13. Computer 100 transmits the driving command at each timing at which transmission should be started. Receiving the driving command, X-axis motor 11, Y-axis motor 12, and rotational-mirror motor 13 each start moving. X-axis motor 11, Y-axis motor 12, and rotational-mirror motor 13 output, to trigger device 110, respective motor drive pulses indicating respective amounts of rotation.

Trigger device 110 divides the received motor drive pulses by a predetermined number to calculate the current positions (angles) on the X axis and the Y axis, as well as the rotational angle of rotational plane mirror 5. Trigger device 110 outputs to detecting unit 8 a trigger pulse for instructing imaging, at angular intervals corresponding to predetermined observation points, namely points which are observed.

Receiving the trigger pulse from trigger device 110, detecting unit 8 performs imaging and outputs image data obtained through the imaging to computer 100. Each time detecting unit 8 receives the trigger pulse from trigger device 110, detecting unit 8 repeats imaging and transmission of the image data. Based on the order in which the image data are input, computer 100 identifies the measurement position (space coordinates and rotational angle) of each image data. Then, computer 100 processes the obtained image data in a manner described later herein, to calculate the light distribution characteristic of light source 10.

The electrical configuration as shown in FIG. 2 is employed to thereby avoid increase of the load involved in the control of the imaging timing by computer 100 even if a plurality of detecting units 8 are arranged, and therefore, there is less restriction on the number of detecting units 8 to be installed.

<<b2: Electrical Configuration of Computer 100>>

Figure 3:
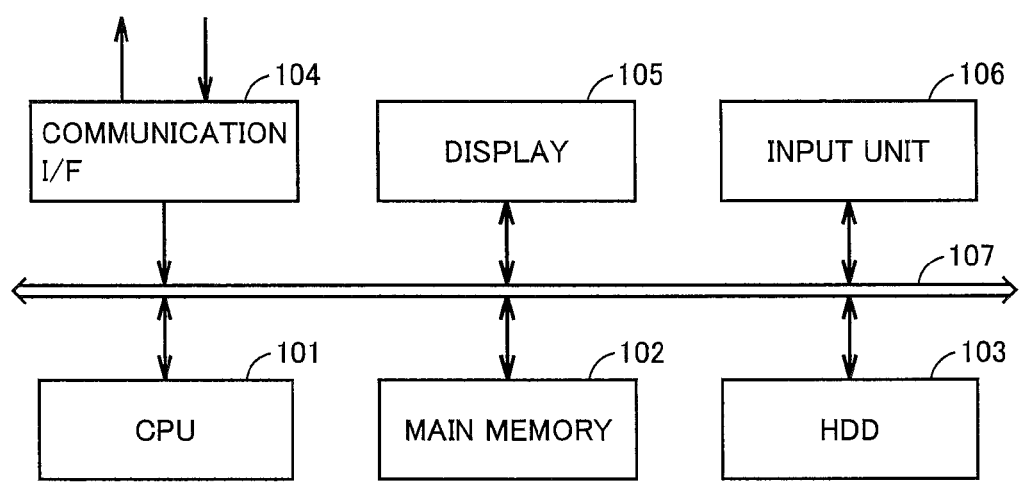
FIG. 3 is a schematic diagram showing an internal configuration of a computer shown in FIG. 2.

FIG. 3 is a schematic diagram showing an internal configuration of computer 100 shown in FIG. 2. Computer 100 is typically configured of a general-purpose personal computer. More specifically, referring to FIG. 3, computer 100 includes a CPU (Central Processing Unit) 101, a main memory 102, an HDD (Hard Disk Drive) 103, a communication interface (I/F) 104, a display 105, and an input unit 106. These components are connected to each other via a bus 107 so that they can communicate with each other.

CPU 101 is a processor which executes a program stored in HDD 103 for example to thereby implement capabilities of the present embodiment. Main memory 102 provides a working area necessary for CPU 101 to execute the program. In this working area, temporary data necessary for execution of the program and image data to be processed, for example, are stored. HDD 103 stores in a non-volatile manner a program executed by CPU 101 and parameters necessary for execution of processing, for example. In HDD 103, the program executed by CPU 101 is installed in advance. For installation of the program, a variety of methods may be employed. For example, a method according to which a program stored in any of a variety of recording media such as CD-ROM (Compact Disk-Read Only Memory) or DVD (Digital Versatile Disk) is read by an associated device and stored in HDD 103, or a method according to which the program is downloaded via a network, for example, may be employed.

Communication interface 104 communicates data with other devices. Specifically, communication interface 104 outputs the driving commands to the motors and receives image data obtained through imaging by detecting unit 8.

Display 105 displays the image data obtained by imaging as well as the results of measurement. Specifically, display 105 is configured of an LCD (Liquid Crystal Display) or CRT (Cathode Ray Tube), for example. Input unit 106 accepts operation by a user. Specifically, input unit 106 is configured of a mouse and/or keyboard, for example. To computer 100, another output device such as printer may be connected as required.

A variety of capabilities of the present embodiment may be implemented entirely or partially by means of a dedicated processor or IC (Integrated Circuit), for example, instead of implemented by being provided through execution of a program by CPU 101. Instead, it may be implemented by means of a dedicated LSI (Large Scale Integration).

<C. Advantages of Light Distribution Characteristic Measurement Apparatus>

As shown in FIG. 1, light distribution characteristic measurement apparatus 1 in the present embodiment uses one or more than one mirror to fold back the optical path from light source 10, and thereby measure the light distribution characteristic of the light source whose light emission surface is relatively large, while the apparatus is kept compact in size. Namely, even in the case of a short distance to light source 10 from the rotational axis (central axis) of support 3 of light distribution characteristic measurement apparatus 1, light source 10 having a large light emission surface can still be imaged by detecting unit 8.

While detecting unit 8 is a relatively heavy component, detecting unit 8 is placed in the vicinity of the rotational axis of support 3 as shown in FIG. 1, so that the axis about which detecting unit 8 is rotationally driven can be prevented from being excessively loaded. Moreover, the structure of support 3 itself can be simplified and therefore the power required for rotatably driving support 3 can be made smaller.

For light distribution characteristic measurement apparatus 1 shown in FIG. 1, two mirrors can be used to make the light unpolarized that is to be input from light source 10 to detecting unit 8. As described above, stationary plane mirror 6 arranged to precede detecting unit 8 may be dispensed with so that the light reflected from rotational plane mirror 5 directly enters detecting unit 8. Alternatively, a greater number of mirrors may be used to direct the light from light source 10 to detecting unit 8.

Figure 4:
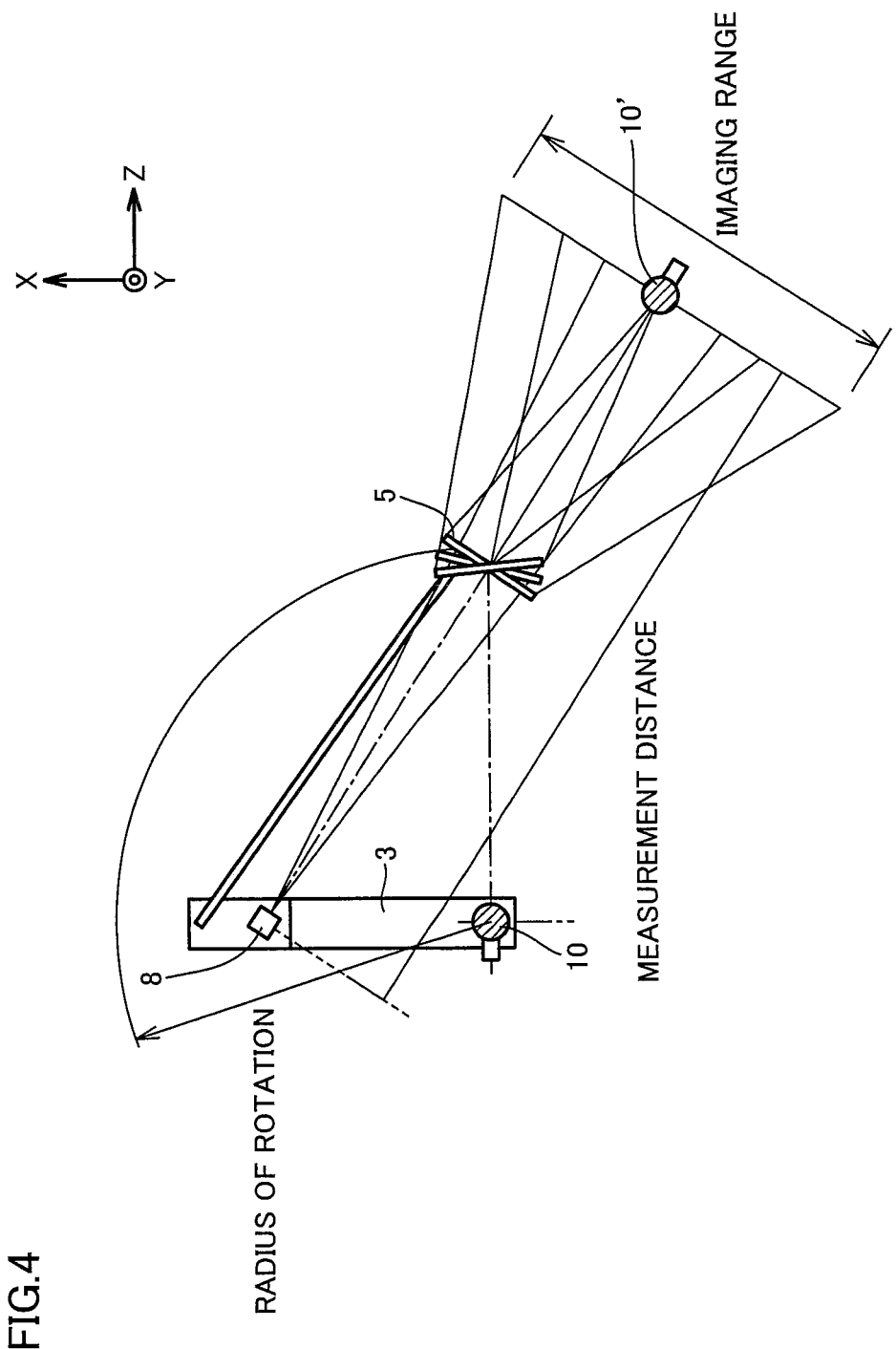
FIG. 4 is a diagram for explaining an imaging range and a measurement distance of the light distribution characteristic measurement apparatus in the present embodiment.

FIG. 4 is a diagram for explaining an imaging range and a measurement distance of light distribution characteristic measurement apparatus 1 in the present embodiment. For the sake of convenience of explanation, FIG. 4 shows a configuration in which the light reflected from rotational plane mirror 5 directly enters detecting unit 8. In addition, lens 7 is not shown.

Referring to FIG. 4, rotational plane mirror 5 positioned opposite to light source 10 directs the light emitted from light source 10 to detecting unit 8. Namely, through the use of rotational plane mirror 5, an optical system is configured as if detecting unit 8 captures a virtual image 10' corresponding to light source 10.

The configuration of light distribution characteristic measurement apparatus 1 in the present embodiment can be employed to lessen the load on the drive axis about which support 3 is rotationally driven, which accordingly makes it easier to arrange a plurality of detecting units 8 on support 3.

Since the optical system is thus configured as if detecting unit 8 captures a virtual image 10', the substantial measurement distance can be kept relatively long even when the radius of rotation of support 3 is reduced. In other words, if the method "mirror is used to fold back the optical path" in the present embodiment is not employed, it is necessary, for maintaining the same measurement distance, to place light source 10 at the position of virtual image 10' shown in FIG. 4 and, accordingly, in terms of the apparatus as a whole, a length of approximately twice the length of light distribution characteristic measurement apparatus 1 in the present embodiment is necessary. Namely, the method "mirror is used to fold back the optical path" in the present embodiment can be employed to ensure a measurement distance (the distance from light source 10 to detecting unit 8) which is approximately twice as large as the radius of rotation of support 3. Moreover, since the imaging range is proportional to the measurement distance, a doubled measurement distance enables a doubled imaging range (double×double=quadruple in the case of area) to be ensured.

Light distribution characteristic measurement apparatus 1 in the present embodiment has an expanded imaging range by rotating rotational plane mirror 5 about an axis that is parallel to the X axis and/or the Y axis. Namely, since the rotational angle of rotational plane mirror 5 and the imaging range are relevant to each other, light distribution characteristic measurement apparatus 1 controls the rotational angle of rotational plane mirror 5 and meanwhile calculates the light distribution characteristic of light source 10 by processing image data obtained through imaging at each rotational angle, in connection with the relevant rotational angle.

Even when a line sensor is used instead of the area sensor as detecting unit 8, a two-dimensional image similar to that obtained by means of the area sensor can still be obtained by imaging the light source while rotating rotational plane mirror 5.

Thus, rotational plane mirror 5 is placed at the leading end of arm 4 of the goniometer and detecting unit 8 is placed near the rotational axis of arm 4 to thereby ensure a sufficient distance between rotational plane mirror 5 and detecting unit 8 and reduce the size and weight of the whole apparatus.

<D. Difference in Optical System of Light Distribution Characteristic Measurement Apparatus>

Figure 5:
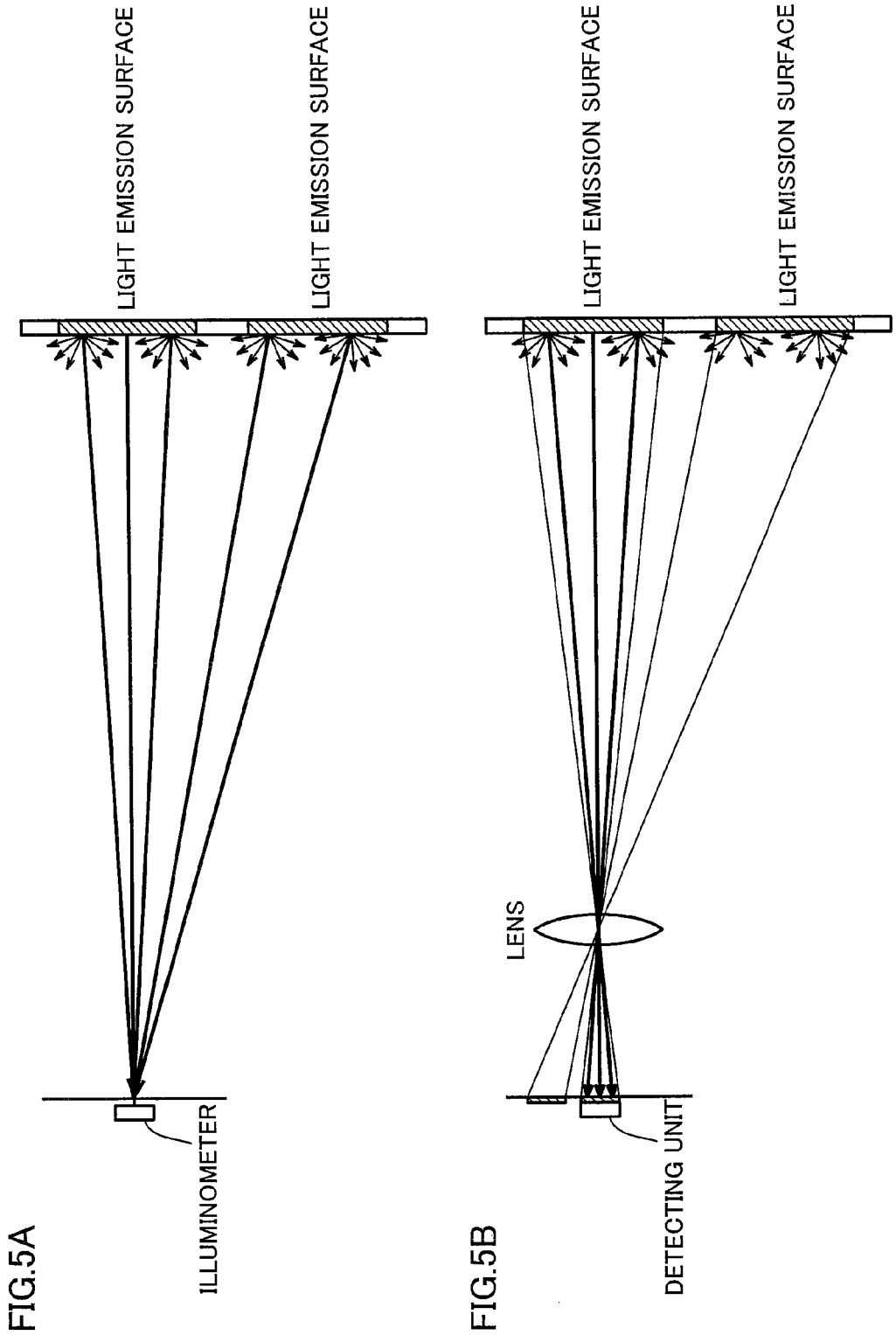
FIGS. 5A and 5B are schematic diagrams for explaining how an optical system of the light distribution characteristic measurement apparatus in the present embodiment is different.

Next, for the sake of deepening understanding of light distribution characteristic measurement apparatus 1 in the present embodiment, a description will be given of how the optical system thereof is different from that of a light distribution characteristic measurement apparatus using an illuminometer. FIGS. 5A and 5B are schematic diagrams for explaining how the optical system of light distribution characteristic measurement apparatus 1 in the present embodiment is different.

<<d1: Far-Field Light Distribution Characteristic: Method Using Illuminometer>>

In the case where an illuminometer is used, the far-field light distribution characteristic is to be measured. In this case, as shown in FIG. 5A, the illuminometer directly receives the light emitted from a light emission surface of a light source to thereby measure the illuminance of the light source. Through this measurement of the illuminance, the intensity of the light received at the light receiving surface of the illuminometer is measured. If the light radiated from the light source to be measured is diverging light, an increased distance between the illuminometer and the light source results in darker light received by the illuminometer. Moreover, the directivity (photoreceiving sensitivity characteristic) at the illuminometer is not controlled, and therefore, the light radiated from the light source is entirely received by the illuminometer as long as no shield is present.

<<d2: Near-Field Light Distribution Characteristic: Measurement of Luminance>>

In contrast, light distribution characteristic measurement apparatus 1 in the present embodiment is configured to measure the near-field light distribution characteristic. In this case, as shown in FIG. 5B, a lens is used to control the directivity at the detecting unit. Namely, the light emitted from the light source is concentrated by the lens and then enters the detecting unit. This means that the detecting unit is focused on the light emission surface of the light source and accordingly the detecting unit captures an image of the light emission surface of the light source. In other words, with the directivity at the detecting unit controlled by the lens, the brightness of the light emission surface of the light source is measured, which means that the luminance of the light source is measured. Light distribution characteristic measurement apparatus 1 thus includes the lens for adjusting a focal point of the detecting unit on the light emission surface of the light source.

Thus, the light at a certain solid angle is captured with the directivity controlled by the lens. Even if the light radiated from the light source to be measured is diverging light, an increased distance between the detecting unit and the light source does not result in darker light received by the detecting unit, which is different from the above described measurement of the illuminance.

Namely, in contrast to the light distribution characteristic measurement apparatus using the illuminometer as shown in FIG. 5A which receives the light radiated from the whole light source toward the illuminometer, the light distribution characteristic measurement apparatus using the lens as shown in FIG. 5B measures the surface luminance of the light source at a specific angle and a specific solid angle and the light captured by the detecting unit has directivity. Accordingly, it can be measured in which direction and with which intensity the light is emitted from each position on the light emission surface of the light source.

<E. Difference in Rotational Plane Mirror of Light Distribution Characteristic Measurement Apparatus>

Figure 6:
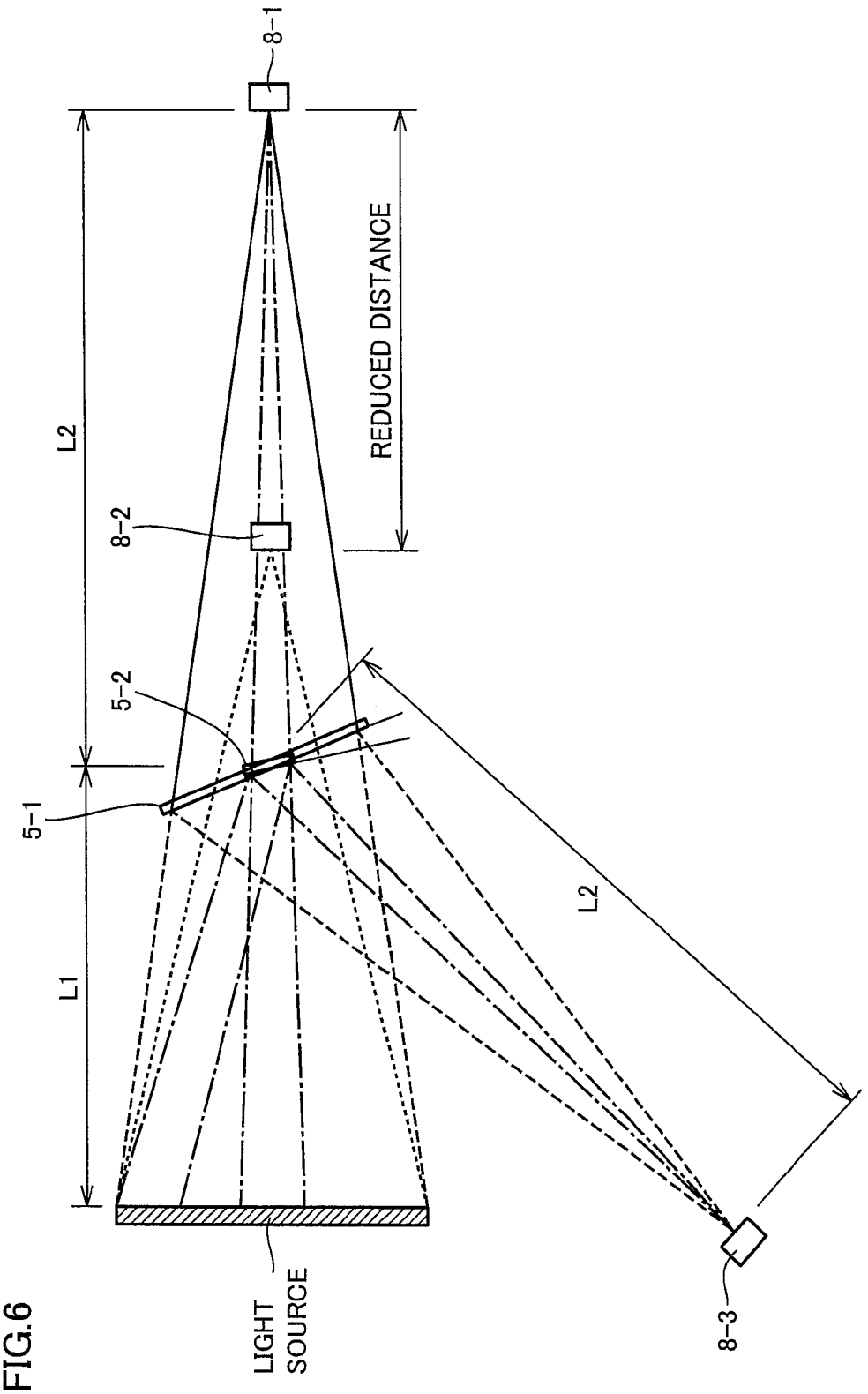
FIG. 6 is a schematic diagram for explaining how the role of a rotational plane mirror of the light distribution characteristic measurement apparatus in the present embodiment is different.

Next, for the sake of deepening understanding of light distribution characteristic measurement apparatus 1 in the present embodiment, a description will be given of how the role of the rotational plane mirror thereof is different from that of a light distribution characteristic measurement apparatus using an illuminometer. FIG. 6 is a schematic diagram for explaining how the role of the rotational plane mirror of light distribution characteristic measurement apparatus 1 in the present embodiment is different.

<<e1: Far-Field Light Distribution Characteristic: Method Using Illuminometer>>

In the case where the light distribution characteristic is measured with an illuminometer, it is necessary for measurement to place a detecting unit at a distance from which a light source to be measured can be perceived as a point. Thus, a detecting unit 8-1 as shown in FIG. 6 for example is used. Here, it is supposed that the method "mirror is used to fold back the optical path" like that for light distribution characteristic measurement apparatus 1 in the present embodiment is employed. Then, a rotational plane mirror 5-1 as shown in FIG. 6 is used and a detecting unit 8-3 is placed instead of detecting unit 8-1. As described above, the light emitted from the light source has to enter the detecting unit. Therefore, in the case where a mirror is used to fold back the optical path, it is necessary to use rotational plane mirror 5-1 which is sized enough to include a range (imaging range) of light which can be received by detecting unit 8-1 (or detecting unit 8-3), and thereby fold back the optical path. In other words, if rotational plane mirror 5-1 is sized smaller than the range of light which can be received by detecting unit 8-1, a part of the light emitted from the light source will not enter the detecting unit, and therefore, the illuminance of the light source cannot accurately be measured.

<<e2: Near-Field Light Distribution Characteristic: Measurement of Luminance>>

In contrast, in the case where the luminance of the light source is measured to thereby calculate the light distribution characteristic, it is unnecessary for measurement to place a detecting unit at a distance from which a light source to be measured can be perceived as a point, which is different from the case where an illuminometer is used to measure the light distribution characteristic. Rather, the characteristics of a lens can appropriately be set to perform measurement with detecting unit 8-1 placed at a distance L2 from which the whole of the light source can be measured (namely the distance from which the whole light source can be imaged). Here, it is supposed that the method "mirror is used to fold back the optical path" is employed. Then, it is necessary to use rotational plane mirror 5-1 which is sized enough to include the picture angle between detecting unit 8-1 and the whole of the light source, and thereby fold back the optical path.

It should be noted that, in the case where the luminance is measured, in contrast to the case where the illuminance is measured as described above, the characteristics of the lens to be used can be changed to thereby change the picture angle between detecting unit 8-1 and the whole light source, namely the range of light to be reflected by the rotational plane mirror. Therefore, it is also possible to have a shortened distance between the mirror and a detecting unit 8-2 and accordingly downsize rotational plane mirror 5.

Namely, the light distribution characteristic measurement apparatus using the illuminometer as shown in FIG. 5A has to measure the whole of the light emitted from the light source, and therefore, rotational plane mirror 5 cannot be sized smaller than the size corresponding to the picture angle between the light source and the detecting unit (for example, a large mirror like rotational plane mirror 5-1 shown in FIG. 6 is necessary). In contrast, the light distribution characteristic measurement apparatus using the lens as shown in FIG. 5B can employ a smaller rotational plane mirror 5-2. In this case, rotational plane mirror 5-2 can be rotated and measurement of a part of the light source can be repeated to thereby measure the luminance of the whole light source.

In the present embodiment, the rotational plane mirror can be rotated vertically and horizontally to thereby expand the imaging range.

<F. Method for Measuring Surface Luminance of Light Source>

Next, detecting unit 8 and rotational plane mirror 5 for measuring the surface luminance of light source 10 will be described.

<<f1: Type of Detecting Unit>>

Detecting unit 8 of light distribution characteristic measurement apparatus 1 in the present embodiment may be any of point sensor, line sensor, and area sensor. For such a sensor, lens 7 is used to control the solid angle of measurement so that its focal point is adjusted on the light emission surface of light source 10, and then measurement is performed.

In the case where the light emission surface of light source 10 is large, the point sensor cannot be used to obtain, at a time, the overall information about the surface luminance of the light source, and therefore, detecting unit 8 (point sensor) is moved to expand the imaging range.

As for the line sensor, like the point sensor, lens 7 can also be used to obtain a linear image (information about the luminance) representing the surface luminance of light source 10. If the light emission surface of light source 10 is large, detecting unit 8 (line sensor) and/or rotational plane mirror 5 is moved to expand the imaging range.

As for the area sensor as well, like the point sensor and the line sensor, lens 7 can be used to obtain image data (information about the luminance) representing the surface luminance of light source 10. If the light emission surface of light source 10 is large, an image (information about the luminance) representing the surface luminance of light source 10 can be obtained through the use of a method such as (1) a lens of a wider angle is used to shorten the focal length and accordingly a greater range is imaged (namely the positional relation between detecting unit 8 and lens 7 is changed), (2) the distance from light source 10 to detecting unit 8 is changed (namely, with the positional relation between detecting unit 8 and lens 7 maintained, only the distance between light source 10 and detecting unit 8 is changed), and (3) detecting unit 8 is moved (namely, with the positional relation between detecting unit 8 and lens 7 maintained, the direction and/or the position of lens 7 with respect to detecting unit 8 is changed).

<<f2: Measurement of Surface Luminance with Line Sensor>>

First, a method using a line sensor for measuring the surface luminance of light source 10 will be described. It is supposed that the line sensor whose solid angle of measurement is controlled by lens 7 is used as detecting unit 8 shown in FIG. 1. The light emitted from light source 10 is folded back by rotational plane mirror 5 to enter detecting unit 8. When the measurement is performed, rotational plane mirror 5 is rotated to expand the imaging range of detecting unit 8.

Figure 7:
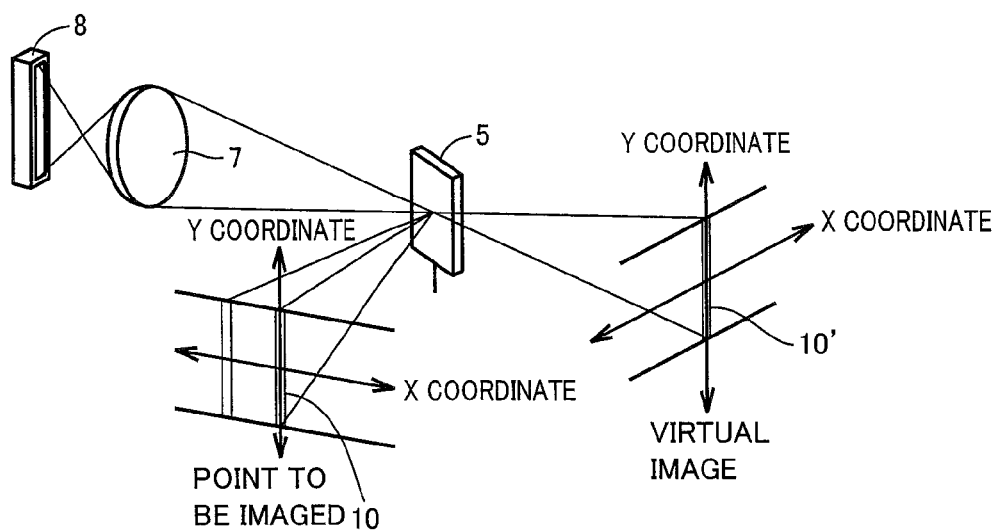
FIG. 7 is a schematic diagram showing a configuration where a line sensor is used as a detecting unit of the light distribution characteristic measurement apparatus in the present embodiment.

FIG. 7 is a schematic diagram showing a configuration where the line sensor is used as detecting unit 8 of light distribution characteristic measurement apparatus 1 in the present embodiment. Referring to FIG. 7, a description will be given of a relation between rotational plane mirror 5 and light source 10 which is an object to be imaged, in the case where the line sensor is used as detecting unit 8. The vertical angle of view is determined by the distance from lens 7 to the object as well as the observation point, in the vertical direction, of the object to be measured. The horizontal angle of view is determined by the rotational angle of rotational plane mirror 5. In the case where the image of the object is successively captured by the line sensor, it is necessary to image the object while moving rotational plane mirror 5 by a relatively small angle at a time. It should be noted that if rotational plane mirror 5 is oriented at an angle equal to or smaller than the imaging width which can be captured by the vertical width of the line sensor, captured images of the object will overlap each other. The rotational angle of rotational plane mirror 5 is set so that such overlapping images will not be captured.

In this way, the line sensor and rotational plane mirror 5 can be used to obtain a two-dimensional image of the object, similarly to the case where the area sensor is used.

Next, a description will be given of methods for calculating the angle of view and the space coordinates in the case where the line sensor and rotational plane mirror 5 are used.

Figure 8A:
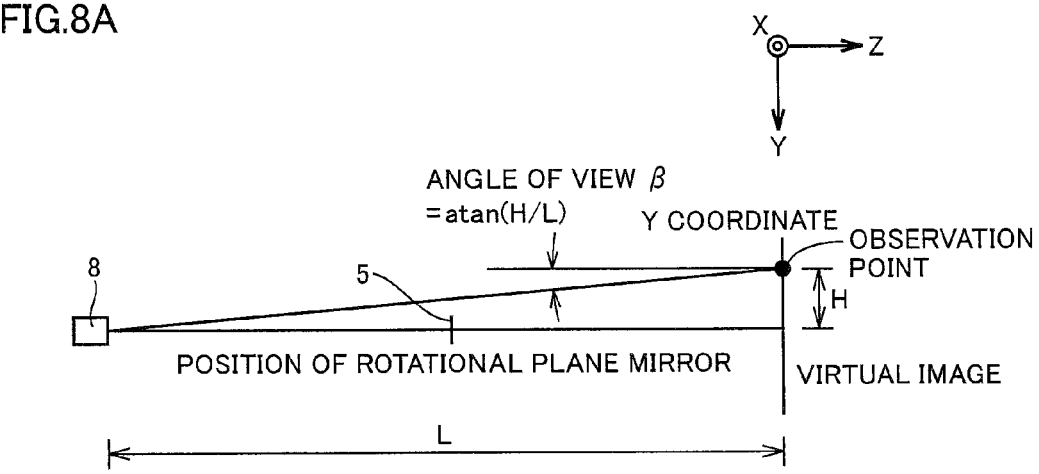
FIGS. 8A and 8B are diagrams for explaining a method for calculating an angle of view in the configuration where the line sensor is used as the detecting unit of the light distribution characteristic measurement apparatus in the present embodiment.
Figure 8B:
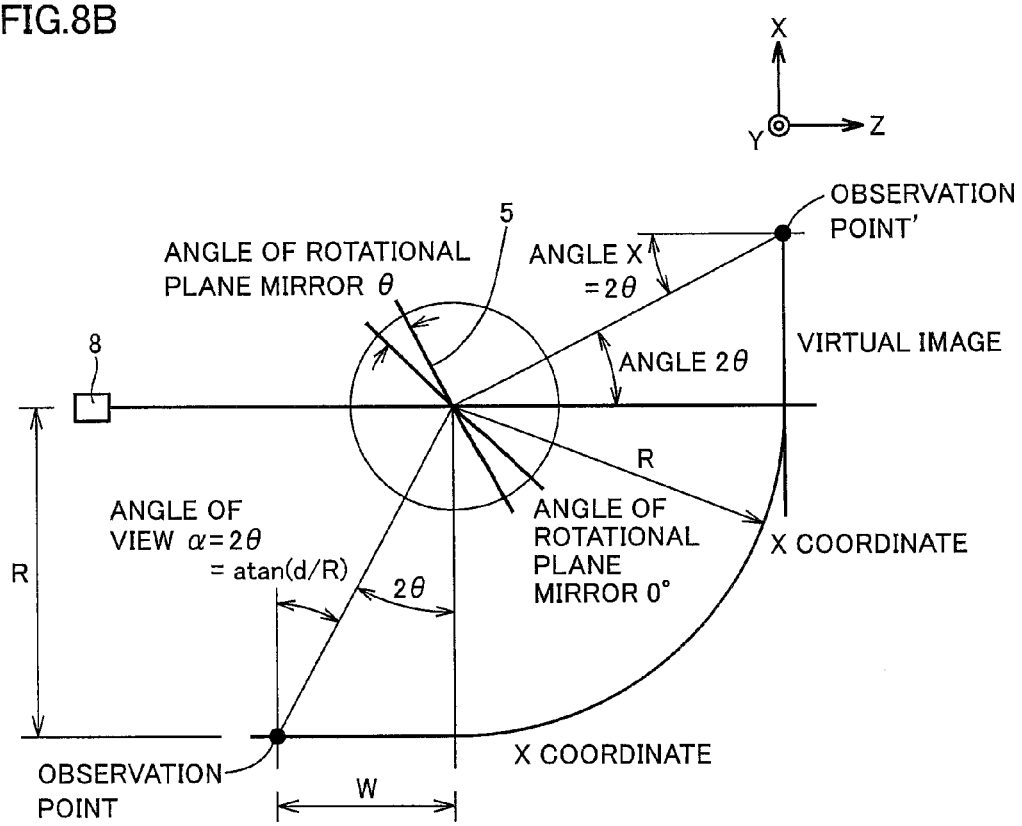

FIGS. 8A and 8B are diagrams for explaining a method for calculating the angle of view in the configuration where the line sensor is used as detecting unit 8 of light distribution characteristic measurement apparatus 1 in the present embodiment. FIG. 8A shows a cross-sectional view along a Y-Z plane and FIG. 8B shows a cross-sectional view along an X-Z plane. For the sake of convenience of the description, lens 7 to be placed on the light incidence side of detecting unit 8 is not shown, which is the same for other drawings.

In order to calculate the light distribution characteristic from a two-dimensional image, it is necessary to calculate the angle of view at an imaging position. For a surface of the object to be imaged (hereinafter also referred to as "surface to be imaged"), the horizontal axis and the vertical axis are defined respectively as X axis and Y axis as shown in FIG. 7, and respective angles of view with respect to these axes are represented by $\alpha$ and $\beta$, respectively.

Angle of view $\alpha$ is proportional to the rotational angle of rotational plane mirror 5, and angle of view $\beta$ is a certain value depending on the length of the detecting unit of the line sensor. Specifically, angle of view $\alpha$ is twice as large as the rotational angle $\theta$ of rotational plane mirror 5 ($\alpha=2\theta$).

Regarding the space coordinates of an observation point, the Y-axis coordinate value is represented by H and the X-axis coordinate value is represented by W. Since the picture angle of detecting unit 8 is constant, coordinate value H can be calculated from a captured image, based on the information about this picture angle.

In contrast, coordinate value W is: $W=R\cdot\tan(2\theta)$ where R is the distance from rotational plane mirror 5 to the surface to be imaged.

In this way, computer 100 (processor) calculates the angle of view of detecting unit 8 with respect to light source 10, in connection with the rotational angle of rotational plane mirror 5.

<<f3: Measurement of Surface Luminance with Area Sensor>>

Next, a method using an area sensor for measuring the surface luminance of light source 10 will be described. It is supposed that the area sensor is placed as detecting unit 8 shown in FIG. 1. The light emitted from light source 10 is folded back by rotational plane mirror 5 to enter detecting unit 8. When the measurement is performed, rotational plane mirror 5 is rotated to expand the imaging range of detecting unit 8.

Figure 9:
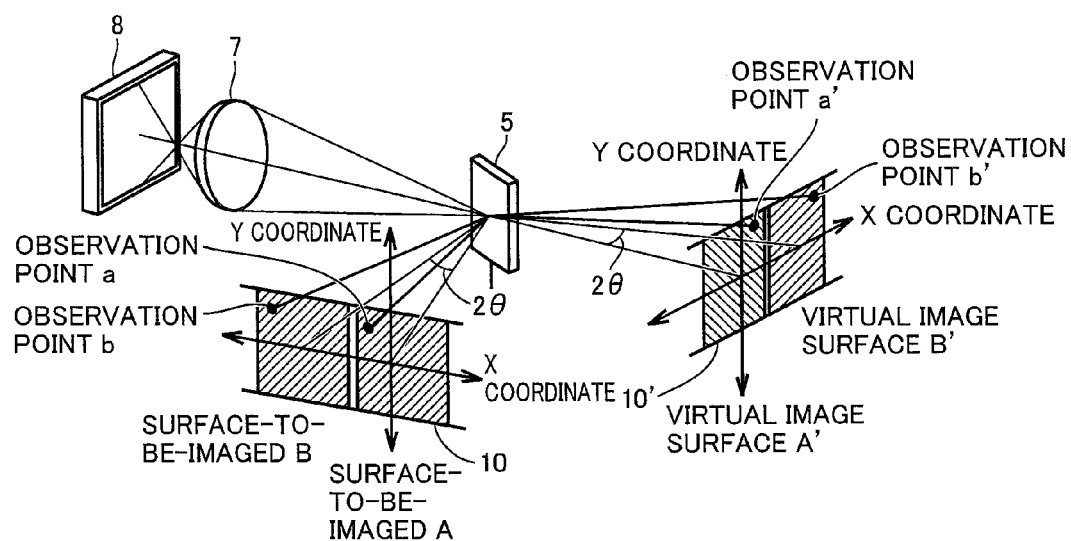
FIG. 9 is a schematic diagram showing a configuration where an area sensor is used as the detecting unit of the light distribution characteristic measurement apparatus in the present embodiment.

FIG. 9 is a schematic diagram showing a configuration where the area sensor is used as detecting unit 8 of light distribution characteristic measurement apparatus 1 in the present embodiment. As shown in FIG. 9, rotational plane mirror 5 is placed between detecting unit 8 and a surface-to-be-imaged of the object to thereby control the optical path. The angle of rotational plane mirror 5 can be changed to change the position of a surface-to-be-imaged that is to enter detecting unit 8. In order to calculate the light distribution characteristic using the area sensor and lens 7 in this way, it is necessary to calculate the angle of view with respect to each observation point of the surface-to-be-imaged. For calculation of the angle of view, the position where rotational plane mirror 5 is placed and the angle of rotational plane mirror 5 are taken into consideration.

Figure 10A:
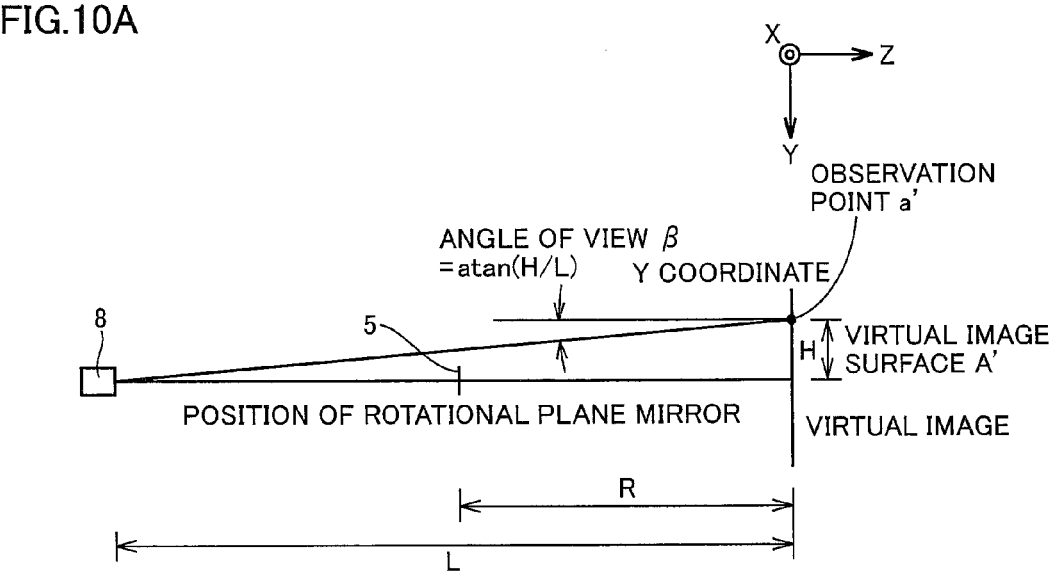
FIGS. 10A and 10B are schematic diagrams for explaining a method for calculating an angle of view in the configuration where the area sensor is used as the detecting unit of the light distribution characteristic measurement apparatus in the present embodiment.
Figure 10B:
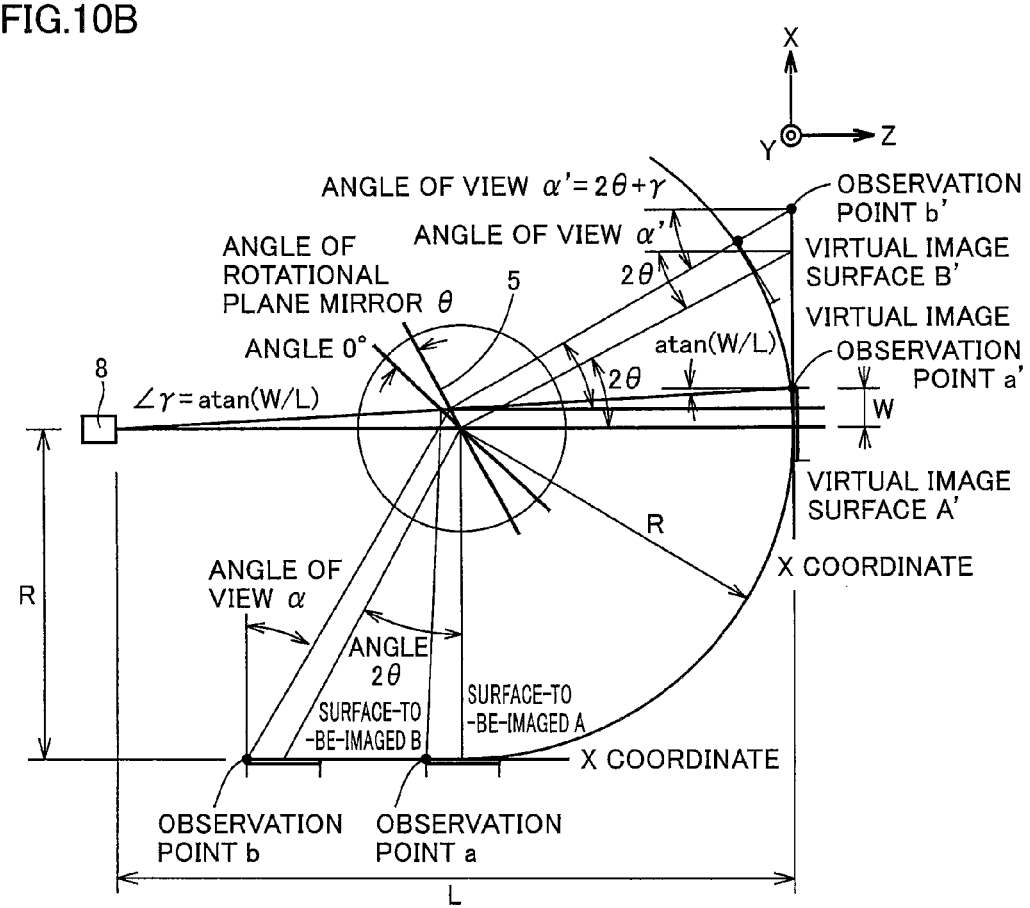

In the following, a description will be given of methods for calculating the angle of view and the space coordinates in the case where the area sensor and rotational plane mirror 5 are used. FIGS. 10A and 10B are schematic diagrams for explaining a method for calculating the angle of view in the configuration where the area sensor is used as detecting unit 8 of light distribution characteristic measurement apparatus 1 in the present embodiment. FIG. 10A shows a cross-sectional view along a Y-Z plane and FIG. 10B shows a cross-sectional view along an X-Z plane.

Referring to FIGS. 10A and 10B, a surface-to-be-imaged A corresponds to an initial value of the rotational angle of rotational plane mirror 5 (typically in the state where rotational plane mirror 5 is not rotated), and a virtual image surface A' corresponds to this surface-to-be-imaged A. An observation point "a" and an observation point "a'" are located on surface-to-be-imaged A and virtual image surface A', respectively. Observation point a is set at the position away in the X-axis direction by W from the axial center and away in the Y-axis direction by H from the axial center. The distance from detecting unit 8 to the surface-to-be-imaged is L and rotational plane mirror 5 is placed at a distance R from the surface-to-be-imaged.

With respect to this initial state, rotational plane mirror 5 is rotated by angle $\theta$, which causes the surface-to-be-imaged to move by $2\theta$. After this rotation, the surface-to-be-imaged is a surface-to-be-imaged B and the virtual image surface corresponding to surface-to-be-imaged B is a surface-to-be-imaged B'. This rotation of rotational plane mirror 5 also causes observation points a and a' to move to observation points b and b', respectively.

Light distribution characteristic measurement apparatus 1 calculates the angle of view with respect to observation point b and the space coordinates of observation point b, when rotational plane mirror 5 is rotated by angle θ.

First, angle of view β in the vertical direction (Y-axis direction) can be calculated from the position where detecting unit 8 is placed and the Y coordinate of observation point a' on the virtual image surface, independently of rotation of rotational plane mirror 5. The Y-axis coordinate value of observation point b' remains the same, namely H.

In contrast, angle of view α in the horizontal direction (X-axis direction) and the X-axis coordinate value of the observation point vary in accordance with rotation of rotational plane mirror 5. More specifically, angle of view α with respect to observation point b corresponds to the sum of an angle of view γ with respect to observation point a' on virtual image surface A' when rotational plane mirror 5 is not rotated and twice the rotational angle θ of the rotational plane mirror. If this calculation is made based on the observation point on the virtual image surface, the sign of the angle is opposite to that when the calculation is made based on the observation point on the surface-to-be-imaged. Thus, computer 100 (processor) calculates the angle of view of detecting unit 8 with respect to light source 10.

Figure 11:
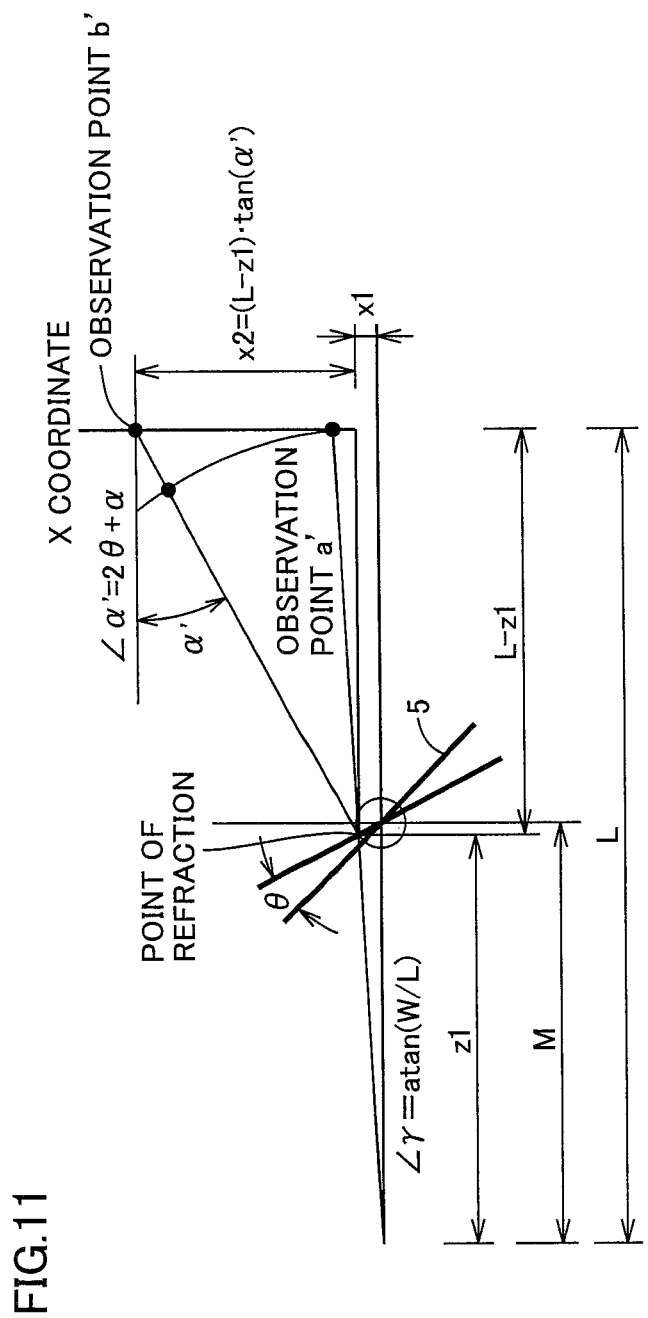
FIG. 11 is a diagram for explaining a procedure for calculating an X coordinate value in the case where the area sensor is used as the detecting unit of the light distribution characteristic measurement apparatus in the present embodiment.
Figure 12:
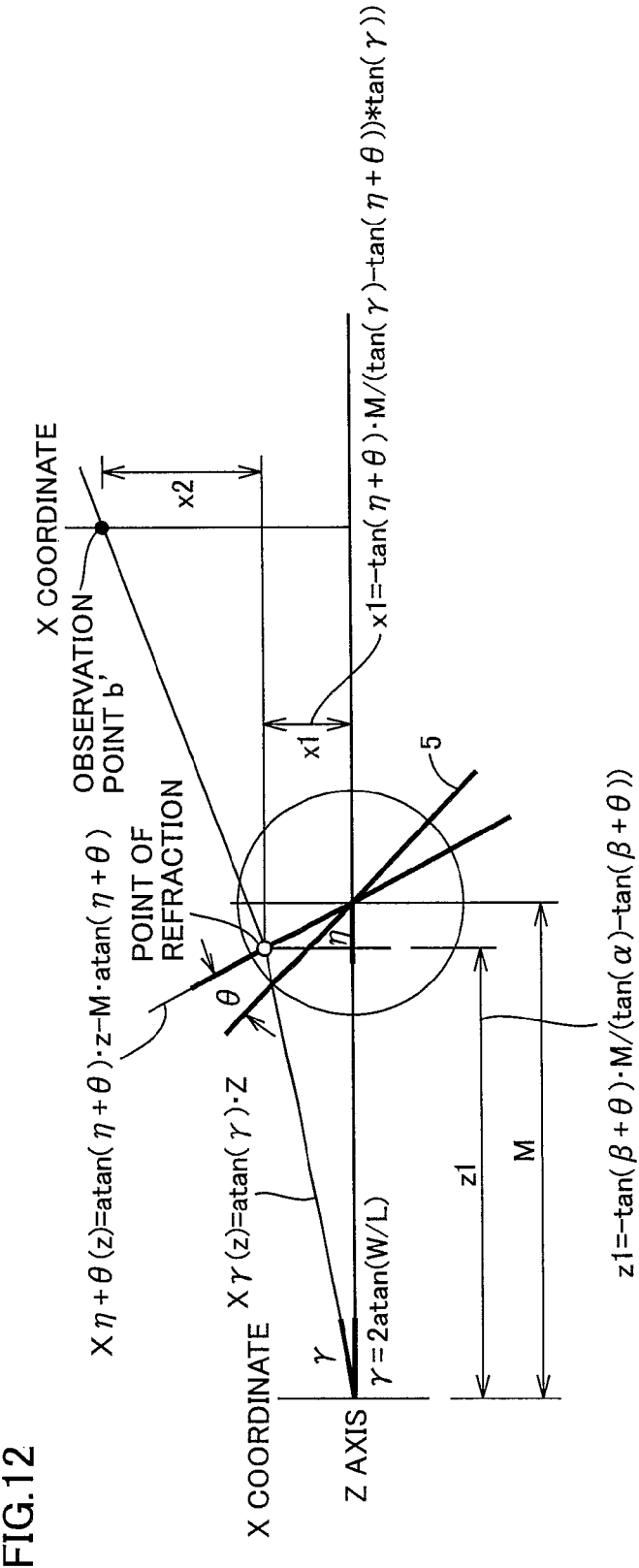
FIG. 12 is a diagram for explaining a procedure for calculating an X coordinate value in the case where the area sensor is used as the detecting unit of the light distribution characteristic measurement apparatus in the present embodiment.

FIGS. 11 and 12 are diagrams for explaining a procedure for calculating the X coordinate value in the case where the area sensor is used as detecting unit 8 of light distribution characteristic measurement apparatus 1 in the present embodiment. The X-axis coordinate value is calculated through the following procedure.

As described above, rotation of rotational plane mirror 5 causes the observation point to move from observation point a to observation point b and accordingly causes the X-coordinate value of the observation point to change. As shown in FIG. 11, the X coordinate value of observation point b' which is a virtual image of observation point b is (x1+x2). X2 can be calculated from angle of view α' (=angle of view α) and the distance to a corresponding point of refraction of rotational plane mirror 5. The point of refraction moves with rotation of rotational plane mirror 5.

As shown in FIG. 12, the space coordinates (X coordinate value and Z coordinate value) of the point of refraction on rotational plane mirror 5 can be calculated from the intersection of a linear function Xγ(z) and a linear function Xη+θ(z). Then, the space coordinates of observation point b' are calculated from the space coordinates of the point of refraction. Here, the calculation is made for the observation point on the virtual image and therefore the sign of the X coordinate value is reversed.

<G. Overall Procedure for Measurement with Light Distribution Characteristic Measurement Apparatus>

Next, a description will be given of a procedure of a process in the case where the light distribution characteristic of light source 10 is measured with light distribution characteristic measurement apparatus 1 in the present embodiment.

<<g1: Process of Rotating Rotational Plane Mirror after Movement to Each Measurement Position>>

First, a description will be given of a typical procedure of a process, specifically an example of a process in the case where support 3 and arm 4 are driven to position detecting unit 8 and rotational plane mirror 5 at each measurement position and, under this condition, rotational plane mirror 5 is rotated to perform measurement. This example process is applicable to both the case where the line sensor is used and the case where the area sensor is used, as detecting unit 8.

Figure 13:
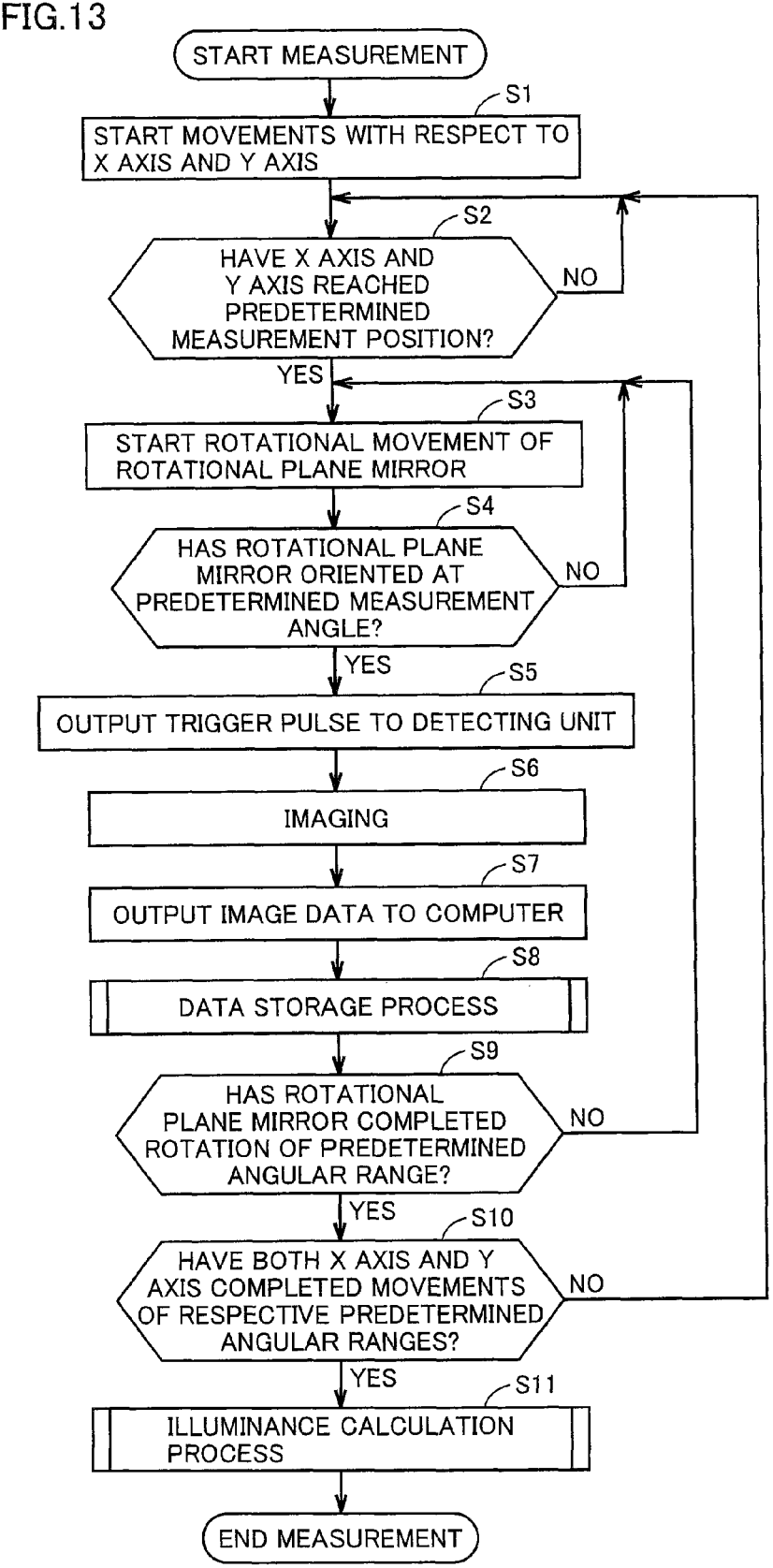
FIG. 13 is a flowchart illustrating an overall procedure of a process for measurement of the light distribution characteristic using the light distribution characteristic measurement apparatus in the present embodiment.

FIG. 13 is a flowchart illustrating an overall procedure of a process for measurement of the light distribution characteristic using light distribution characteristic measurement apparatus 1 in the present embodiment. Each step shown in FIG. 13 is typically implemented by CPU 101 of computer 100 and trigger device 110.

Referring to FIG. 13, in response to an instruction to start measurement, CPU 101 of computer 100 outputs a driving command to X-axis motor 11 and Y-axis motor 12 to thereby start movements with respect to the X axis and the Y axis (step S1). In step S1, the X-axis and the Y-axis are each rotationally driven by a predetermined angle step (angle per movement) in a predetermined angular range (typically ±180° for each of the X axis and the Y axis).

Subsequently, trigger device 110 determines whether or not the X axis and the Y axis have reached a predetermined measurement position (step S2). More specifically, trigger device 110 counts each of the motor drive pulses given respectively from X-axis motor 11 and Y-axis motor 12, and determines whether or not each count value has been incremented by a value corresponding to the predetermined angle step. When the X axis and the Y axis have not reached the predetermined measurement position (NO in step S2), the process is repeated from step S2.

In step S1, the movements may be made in any order as long as the goniometer can be driven to position the X axis and the Y axis at a required measurement position. Typically, a possible method may be as follows. Namely, with the Y axis positioned at a certain angle, the X axis is moved by a predetermined angle step at a time through a predetermined angular range (range of measurement). Then, when a series of measurement operations has been completed, the Y axis is moved by a predetermined angle step and the X axis is moved from the initial position to repeat the series of measurement operations.

In this way, in steps S1 and S2, light distribution characteristic measurement apparatus 1 moves detecting unit 8 configured to detect the light from light source 10 and rotational plane mirror 5 configured to reflect the light from light source 10 to direct the light to detecting unit 8, relative to light source 10, to thereby perform the process of arranging them at a plurality of measurement positions with respect to light source 10.

When the X axis and the Y axis have reached the predetermined measurement position (YES in step S2), CPU 101 of computer 100 outputs a driving command to rotational-mirror motor 13 to start rotational movement of rotational plane mirror 5 (step S3). Subsequently, trigger device 110 determines whether or not rotational plane mirror 5 has oriented at a predetermined measurement angle (step S4). More specifically, trigger device 110 counts the motor drive pulse given from rotational-mirror motor 13, and determines whether or not the count value has been incremented by a value corresponding to the predetermined angle step. When rotational plane mirror 5 has not oriented at the predetermined measurement angle (NO in step S4), the process is repeated from step S3.

Namely, in steps S3 and S4, light distribution characteristic measurement apparatus 1 performs a process of orienting rotational plane mirror 5 by different rotational angles for each measurement point, while maintaining the optical path length from light source 10 to detecting unit 8.

When rotational plane mirror 5 has oriented at the predetermined measurement angle (YES in step S4), trigger device 110 outputs a trigger pulse to detecting unit 8 (step S5). In response to the trigger pulse, detecting unit 8 performs imaging (step S6), and outputs image data obtained through the imaging to computer 100 (step S7). Namely, upon receiving the trigger pulse, detecting unit 8 starts imaging (measurement).

CPU 101 of computer 100 stores the image data received from detecting unit 8, and calculates the luminance for an observation point corresponding to the timing at which the trigger pulse is output, to store the luminance as light distribution data (step S8). Details of this data storage process will be described later herein.

Subsequently, trigger device 110 determines whether or not rotational plane mirror 5 has completed rotation of a predetermined angular range (step S9). When rotational plane mirror 5 has not completed rotation of the predetermined angular range (NO in step S9), the process is repeated from step S3. Namely, when a series of steps S3 to S8 has been completed, rotational plane mirror 5 is oriented at a next rotational angle and a similar series of steps is repeated.

In contrast, when rotational plane mirror 5 has completed the rotation of the predetermined angular range (YES in step S9), trigger device 110 determines whether or not both the X axis and the Y axis have completed respective movements of respective predetermined angular ranges (step S10). When any of the X axis and the Y axis has not completed movement of the predetermined angular range (NO in step S10), the process is repeated from step S2. Typically, when a measurement process for the predetermined angular range of the X axis has been completed, CPU 101 of computer 100 moves the Y axis to a next position and, for the X axis, the series of operations is repeated from the state where the X axis is in the initial position.

In contrast, when both the X axis and the Y axis have completed respective movements of respective predetermined angular ranges (YES in step S10), CPU 101 of computer 100 calculates the illuminance based on the data stored in step S8 (step S11). Thus, when the measurement is completed with both the X axis and the Y axis moved, the illuminance of light source 10 is calculated. Namely, light distribution characteristic measurement apparatus 1 calculates the light distribution characteristic of light source 10 based on a plurality of results of measurement that are detected by detecting unit 8. Thus, the process is ended.

<<g2: Process of Making Movement to Each Measurement Position after Setting Rotational Angle of Rotational Plane Mirror>>

Next, a description will be given of an example process of setting in advance the rotational angle of rotational plane mirror 5 and then rotating the X axis and the Y axis under this condition. This process can also be performed to successively take measurements without the need to stop detecting unit 8 and rotational plane mirror 5 at each measurement position. This example process is suitable for the case where the area sensor is used as detecting unit 8.

Figure 14:
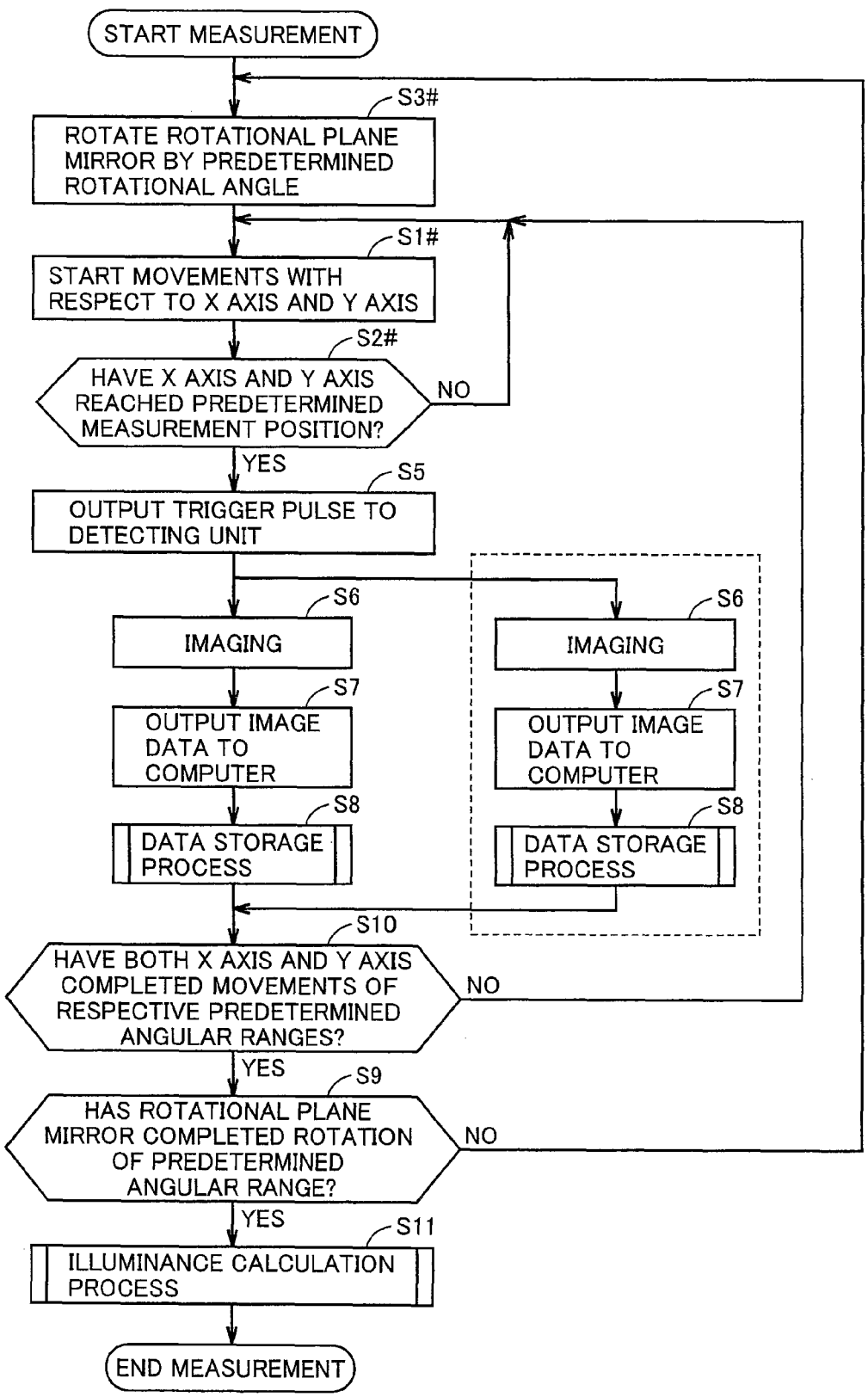
FIG. 14 is a flowchart showing another overall procedure of a process for measurement of the light distribution characteristic using the light distribution characteristic measurement apparatus in the present embodiment.

FIG. 14 is a flowchart showing another overall procedure of a process for measurement of the light distribution characteristic using light distribution characteristic measurement apparatus 1 in the present embodiment. Any step shown in FIG. 14 that is identical in process details to a corresponding step shown in FIG. 13 is denoted by the same step number as that of the corresponding step, and any step that is similar in process details to a corresponding step shown in FIG. 13 is denoted by the same step number with a following symbol "#" attached thereto. Each step shown in FIG. 14 is typically implemented by CPU 101 of computer 100 and trigger device 110.

Referring to FIG. 14, in response to an instruction to start measurement, CPU 101 of computer 100 outputs a driving command to rotational-mirror motor 13 to thereby oriented rotational plane mirror 5 at a predetermined rotational angle (step S3#). Subsequently, CPU 101 of computer 100 outputs a driving command to X-axis motor 11 and Y-axis motor 12 to thereby start movements with respect to the X axis and the Y axis (step S1#).

Subsequently, trigger device 110 determines whether or not the X axis and the Y axis have reached a predetermined measurement position (step S2#). When the X axis and the Y axis have not reached the predetermined measurement position (NO in step S2#), the process is repeated from step S1#.

When the X axis and the Y axis have reached the predetermined measurement positions (YES in step S2#), trigger device 110 outputs a trigger pulse to detecting unit 8 (step S5). In response to the trigger pulse, detecting unit 8 performs imaging (step S6), and outputs image data obtained through the imaging to computer 100 (step S7). CPU 101 of computer 100 stores the image data received from detecting unit 8, and calculates the luminance for an observation point corresponding to the timing at which the trigger pulse is output, to store the luminance as light distribution characteristic data (step S8).

Subsequently, trigger device 110 determines whether or not both the X axis and the Y axis have completed respective movements of respective predetermined angular ranges (step S10). When any of the X axis and the Y axis has not completed movement of the predetermined angular range (NO in step S10), the process is repeated from step S1#.

In contrast, when both the X axis and the Y axis have completed respective movements of respective predetermined angular ranges (YES in step S10), trigger device 110 determines whether or not rotational plane mirror 5 has completed rotation of a predetermined angular range (step S9). When rotational plane mirror 5 has not completed rotation of the predetermined angular range (NO in step S9), the process is repeated from step S3#. Namely, rotational plane mirror 5 is oriented at a next rotational angle and a similar series of steps is repeated.

When rotational plane mirror 5 has completed the rotation of the predetermined angular range (YES in step S9), CPU 101 of computer 100 calculates the illuminance based on the data stored in step S8 (step S11). Thus, the process is ended.

As will be described later herein, in the case where a plurality of detecting units 8 are arranged, the processes each including steps S6, S7, and S8 are performed in parallel where the number of the processes is identical to the number of the arranged detecting units 8.

<H. Data Storage Process>

Figure 15:
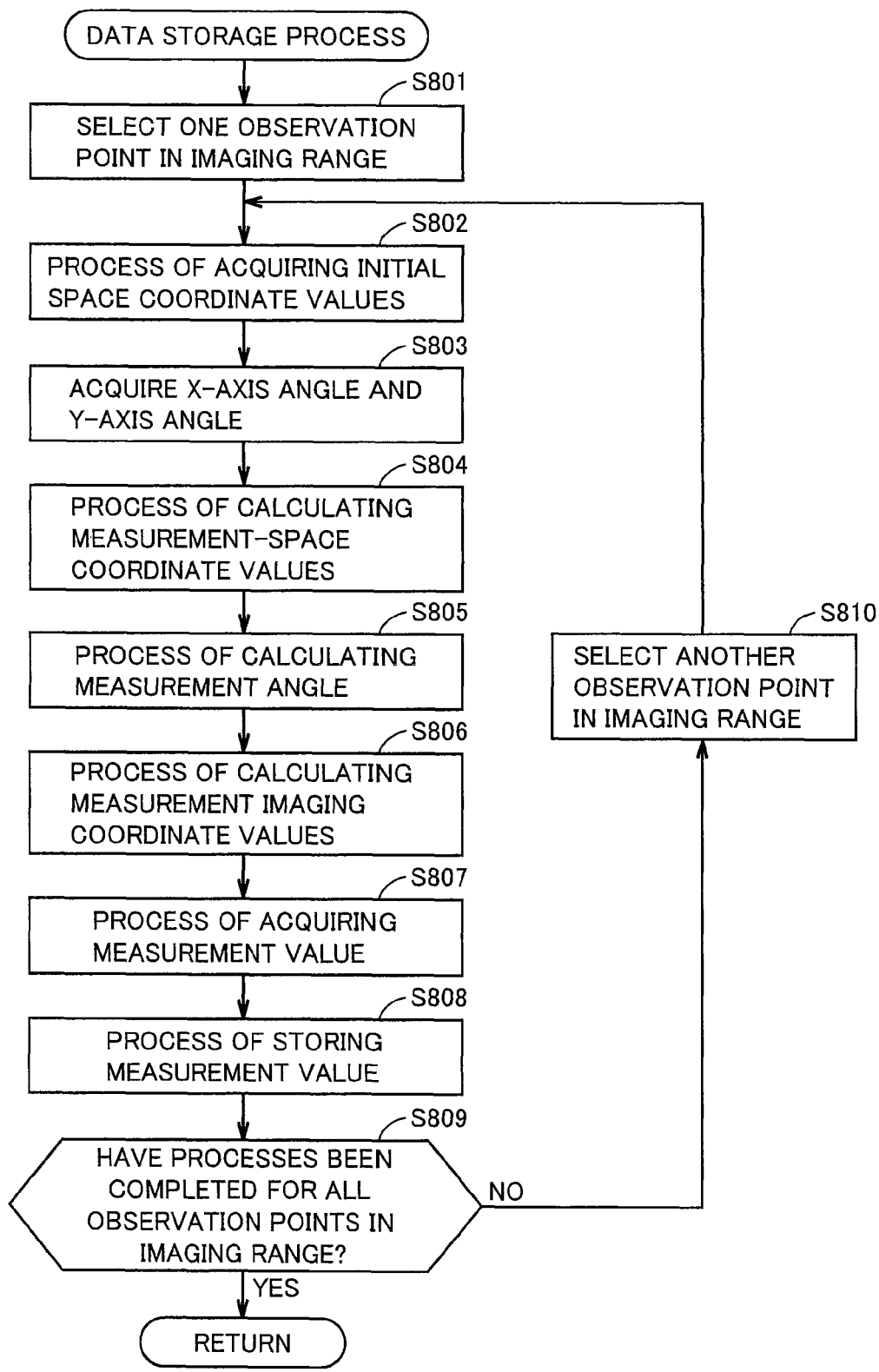
FIG. 15 is a flowchart showing a process procedure for a data storage process shown in step S8 of FIGS. 13 and 14.

Next, details of the data storage process shown in step S8 of FIGS. 13 and 14 will be described. FIG. 15 is a flowchart showing a process procedure for the data storage process shown in step S8 of FIGS. 13 and 14.

In light distribution characteristic measurement apparatus 1, measurement is performed while detecting unit 8 and rotational plane mirror 5 are moved relatively to light source 10, and therefore, it is necessary to successively identify (track) the position, on an object, to be imaged by detecting unit 8. Thus, light distribution characteristic measurement apparatus 1 determines an observation point with respect to light source 10 before starting measurement, and uses this observation point as a reference to thereby determine points of image data obtained as a result of movement of detecting unit 8 and rotational plane mirror 5. For the sake of convenience of the process, the center of each axis is defined as having space coordinate values (0, 0, 0) and, with respect to this, the space coordinates of each observation point are determined.

Referring to FIG. 15, CPU 101 of computer 100 first selects any one observation point in an imaging range of detecting unit 8 (step S801). Subsequently, CPU 101 of computer 100 performs a process of acquiring initial space coordinate values (step S802). In the process of acquiring the initial space coordinate values, under the conditions that one of a plurality of observation points in the imaging range of detecting unit 8 has been selected as an observation point and detecting unit 8 is in its initial state (X-axis angle=0°, Y-axis angle=0°), the space coordinate values (initial space coordinate values) representing this observation point are acquired.

Subsequently, CPU 101 of computer 100 acquires an X-axis angle and a Y-axis angle (step S803) and performs a process of calculating measurement-space coordinate values (step S804). In the process of calculating the measurement-space coordinate values, the coordinate values of the observation point which has moved in accordance with rotation of the X-axis and/or the Y axis are calculated. More specifically, from the initial space coordinate values of the observation point calculated in step S802 as well as the X-axis angle and the Y-axis angle, the space coordinate values of the observation point after being moved are calculated.

Subsequently, CPU 101 of computer 100 performs a process of calculating a measurement angle (step S805). In this process of calculating the measurement angle, an angle of view of detecting unit 8 with respect to the space coordinate values of the observation point after being moved is calculated, and the angle of view is added to the angle of movement relative to the X-axis/Y-axis, to thereby calculate the measurement angle.

Subsequently, CPU 101 of computer 100 performs a process of calculating measurement imaging coordinate values (step S806). In this process of calculating the measurement imaging coordinate values, the coordinate values of the observation point in the imaging range of detecting unit 8 (detecting unit 8's imaging coordinate values) are calculated. Namely, the positional relationship between the detecting unit 8's imaging coordinate values and the observation point corresponds to the relationship between the measurement coordinate values and the detecting unit 8's imaging coordinate values. The space coordinate values of the observation point can be provided to calculate the detecting unit 8's imaging coordinate values. Namely, from the position where detecting unit 8 performs imaging, the observation point can be identified.

Subsequently, CPU 101 of computer 100 performs a process of acquiring a measurement value (step S807). In this process of acquiring the measurement value, the value (brightness) of the identified observation point is read from the image data obtained through the imaging.

Subsequently, CPU 101 of computer 100 performs a process of storing the measurement value (step S808). In this process of storing the measurement value, the value of the observation point acquired in step S807 is stored in association with the measurement angle of the observation point (calculated in step S805) and the initial space coordinate values (calculated in step S802).

Then, CPU 101 of computer 100 determines whether or not the processes have been completed for all observation points in the imaging range of detecting unit 8 (step S809). When the processes have not been completed for all observation points in the imaging range of detecting unit 8 (NO in step S809), CPU 101 of computer 100 selects another observation point (step S810), and performs the processes from step S802.

In contrast, when the processes have been completed for all observation points in the imaging range of detecting unit 8 (YES in step S809), the process returns.

In the following, details of the processes of major steps will be described in more detail.

<<h1: Process of Selecting Observation Point in Imaging Range of Detecting Unit 8 and Process of Acquiring Measurement Value>>

Figure 16:
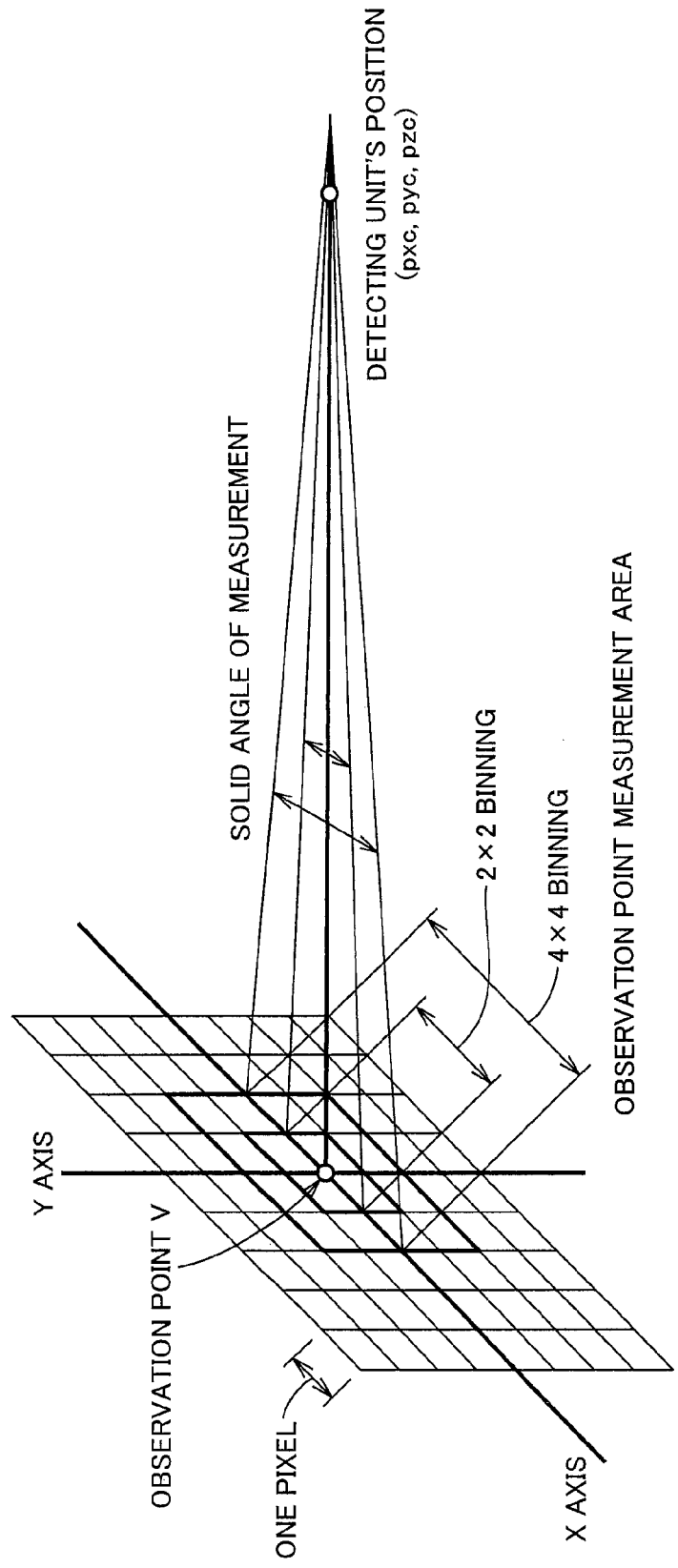
FIG. 16 is a diagram for explaining a process of selecting an observation point in an imaging range shown in FIG. 15 and a process of acquiring a measurement value.

First, a description will be given of the process of selecting an observation point in the imaging range shown in steps S801 and S810 of FIG. 15 as well as the process of acquiring a measurement value shown in step S807 thereof. FIG. 16 is a diagram for explaining the process of selecting an observation point in the imaging range and the process of acquiring the measurement value shown in FIG. 15.

Referring to FIG. 16, observation point V is identified as coordinates on image data taken through imaging by detecting unit 8. In step S807, the measurement value of observation point V is acquired from the luminance of one or a plurality of pixels including measurement point V. Preferably, the integrated average value of the brightness of pixels included in a predetermined area which is defined relative to observation point V (observation point measurement area) is used.

Here, the size of the observation point measurement area is set as appropriate. While an increase of the observation point measurement area improves the S/N (Signal to Noise) ratio, the solid measurement angle increases, which may cause deterioration of the resolving power of the measurement angle. Therefore, depending on the required resolving power or the like, the size of the observation point measurement area is designed as appropriate.

<<h2: Process of Calculating Measurement-Space Coordinate Values>>

Figure 17A:
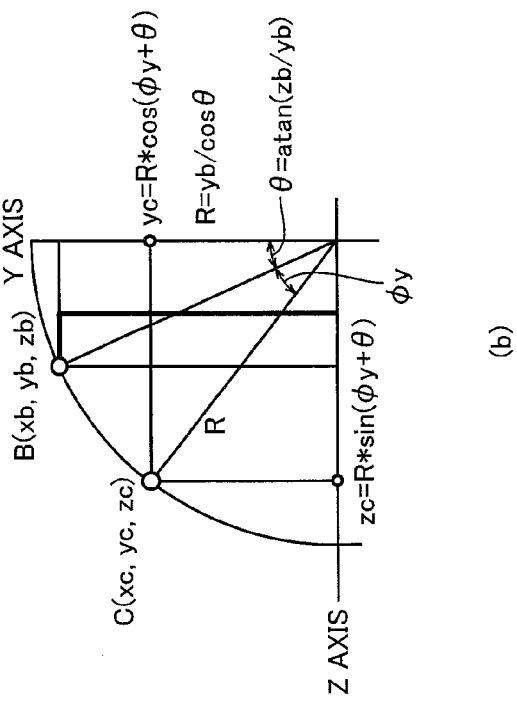
FIGS. 17A and 17B are diagrams for explaining a process of calculating measurement-space coordinate values shown in FIG. 15.
Figure 17B:
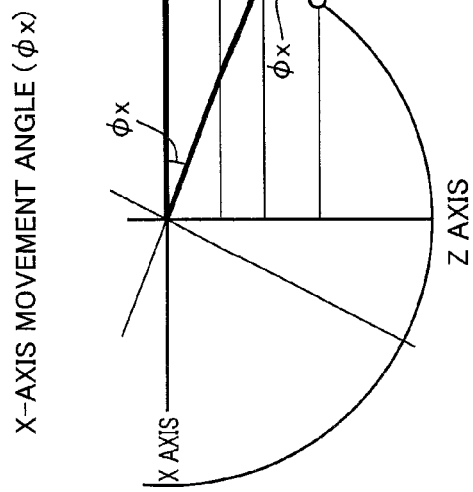

Next, the process of calculating the measurement-space coordinate values shown in step S804 of FIG. 15 will be described. FIGS. 17A and 17B are diagrams for explaining the process of calculating the measurement-space coordinate values shown in FIG. 15. In connection with FIGS. 17A and 17B, the case will be considered first by way of example in which initial position A is rotated relative to the X axis by a movement angle (X-axis movement angle) $\phi x$ to move to position B, and further rotated relative to the Y axis by a movement angle (Y-axis movement angle) $\phi y$ to move to position C.

As shown in FIG. 17A, the coordinate values (xb, yb, zb) of position B after the X-axis movement are calculated in the following manner based on the coordinate values (xa, ya, za) of initial position A and movement angle $\phi x$.

$$xb = xa \times \cos \phi x - za \times \sin \phi x$$

$$yb = ya$$

$$zb = xa \times \sin \phi x - za \times \cos \phi x$$

As shown in FIG. 17B, coordinate values (xc, yc, zc) of position C after the Y-axis movement are further calculated in the following manner. First, the distance R between position B after the X-axis movement and the center coordinates is as follows.

$$R = yb/\cos \theta$$

Angle $\theta$ between position B and the Y axis of the center coordinates is as follows.

$$\theta = a \tan(zb/yb)$$

These values are utilized to calculate, in the following manner, the coordinate values (xc, yc, zc) of position C after the Y-axis movement.

$$xc = xb = xa \times \cos \phi x - za \times \sin \phi x$$

$$yc = R \times \cos(\phi y + \theta)$$

$$zc = R \times \sin(\phi y + \theta)$$

For any of the X-axis rotation and/or the Y-axis rotation, they can be calculated successively in a similar manner to the above-described one.

Further, as described in the above section <F. Method for Measuring Surface Luminance of Light Source>, it is necessary to take into consideration the space coordinate values depending on rotation of rotational plane mirror 5. More specifically, as described above with reference to FIGS. 8A, 8B, 10, 11, and 12, a variation of the space coordinates resultant from rotation of rotational plane mirror 5 is added to the above-described coordinate values.

<<h3: Process of Calculating Measurement Angle>>

Figure 18A:
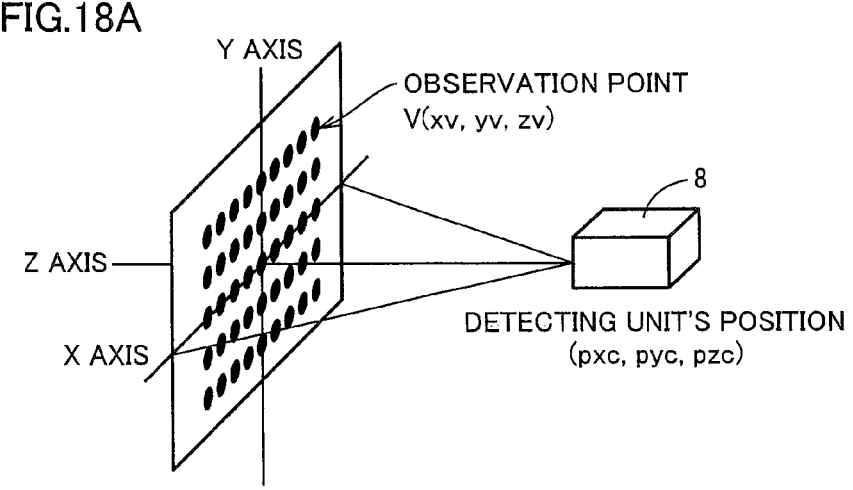
FIGS. 18A and 18B are diagrams for explaining a process of calculating a measurement angle shown in FIG. 15.
Figure 18B:
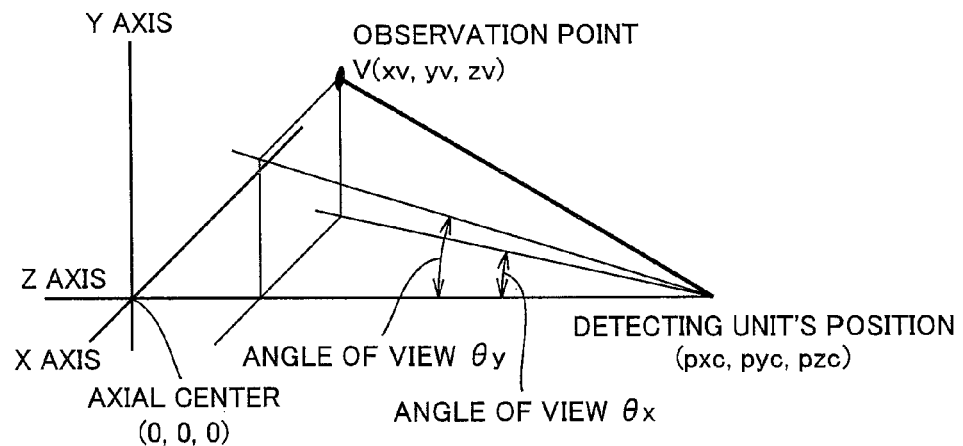
Figure 19:
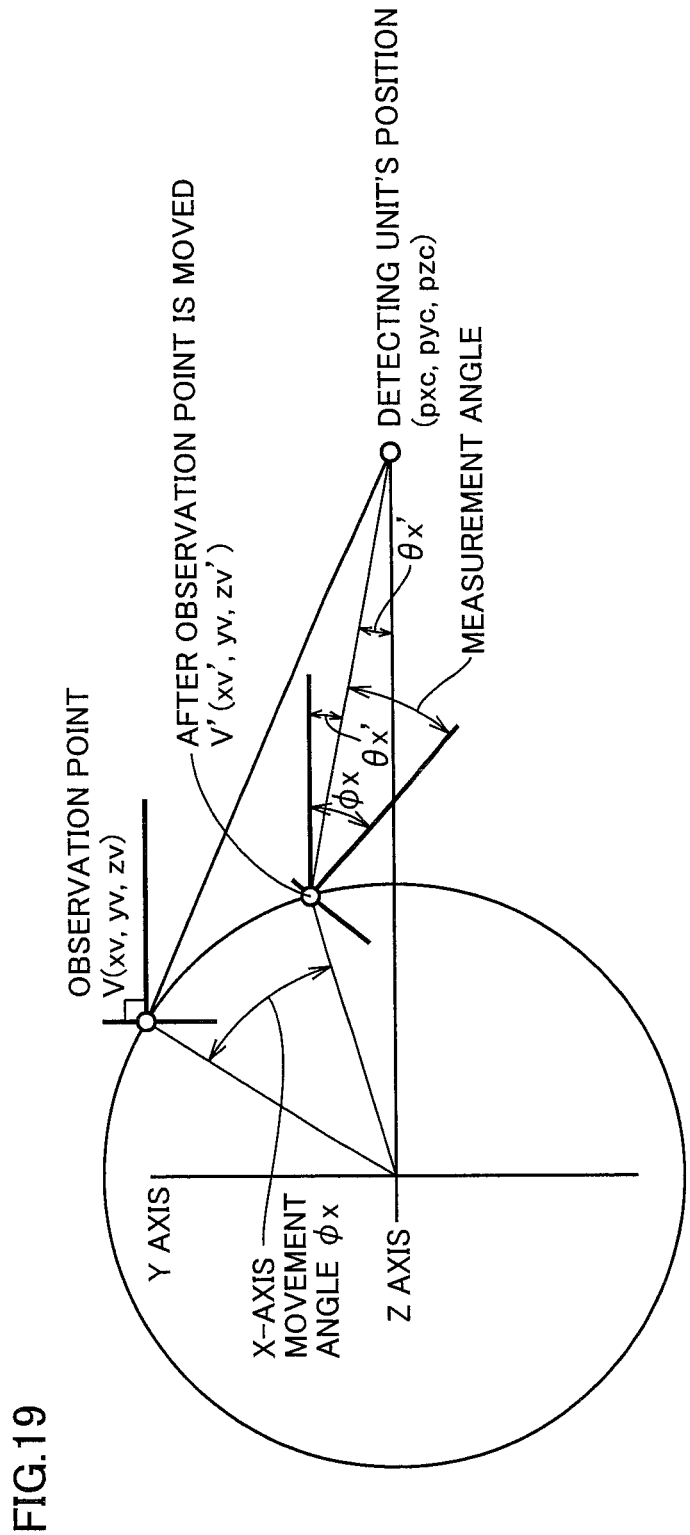
FIG. 19 is a diagram for explaining a process of calculating a measurement angle shown in FIG. 15.

Next, a description will be given of the process of calculating the measurement angle shown in step S805 of FIG. 15. FIGS. 18A, 18B, and 19 are diagrams for explaining the process of calculating the measurement angle shown in FIG. 15. More specifically, FIGS. 18A and 18B show a method for calculating an angle of view, and FIG. 19 shows a method for calculating the measurement angle from the movement angle.

As shown in FIG. 18A, it is supposed that detecting unit 8 is placed at coordinate values (pxc, pyc, pzc), and the coordinate values of any one observation point V in the detecting unit 8's imaging range is (xv, yv, zv). This observation point V corresponds to a light emission point on light source 10. As shown in FIG. 18B, where the center of each axis is at space coordinate values (0, 0, 0), angles of view θx, θy for observation point V are as follows.

$$\theta x = a \tan \{(xv-pxc)/(zv-pzc)\}$$

$$\theta y = a \tan \{(yv-pyc)/(zv-pzc)\}$$

Next, following the procedure as shown in FIG. 19, the measurement angle is calculated from the movement angle of observation point V. For example, it is supposed that observation point V has rotated relative to the X axis by a movement angle (X-axis movement angle) φx. It is also supposed that the rotation relative to the X axis causes observation point V in the initial state to move to observation point V' (xv', yv, zv'). The space coordinates of observation point V' after this movement are calculated from the relationship between the amount of rotational movement and the measurement coordinates. Angle of view θx' of observation point V' is calculated in accordance with the following formula.

$$\theta x' = a \tan \{(xv'-pxc)/(zv'-pzc)\}$$

Further, as described in the above section <F. Method for Measuring Surface Luminance of Light Source>, it is necessary to take into consideration angles of view α and β depending on the rotation of rotational plane mirror 5.

Finally, the measurement angle for observation point V' is calculated as movement angle φx−angle of view θx'−angle of view α. Likewise, in the case where observation point V is rotated relative to the Y axis by movement angle (Y-axis movement angle) φy as well, the measurement angle can be calculated through a similar procedure.

<<h4: Process of Calculating Measurement Imaging Coordinate Values>>

Figure 20:
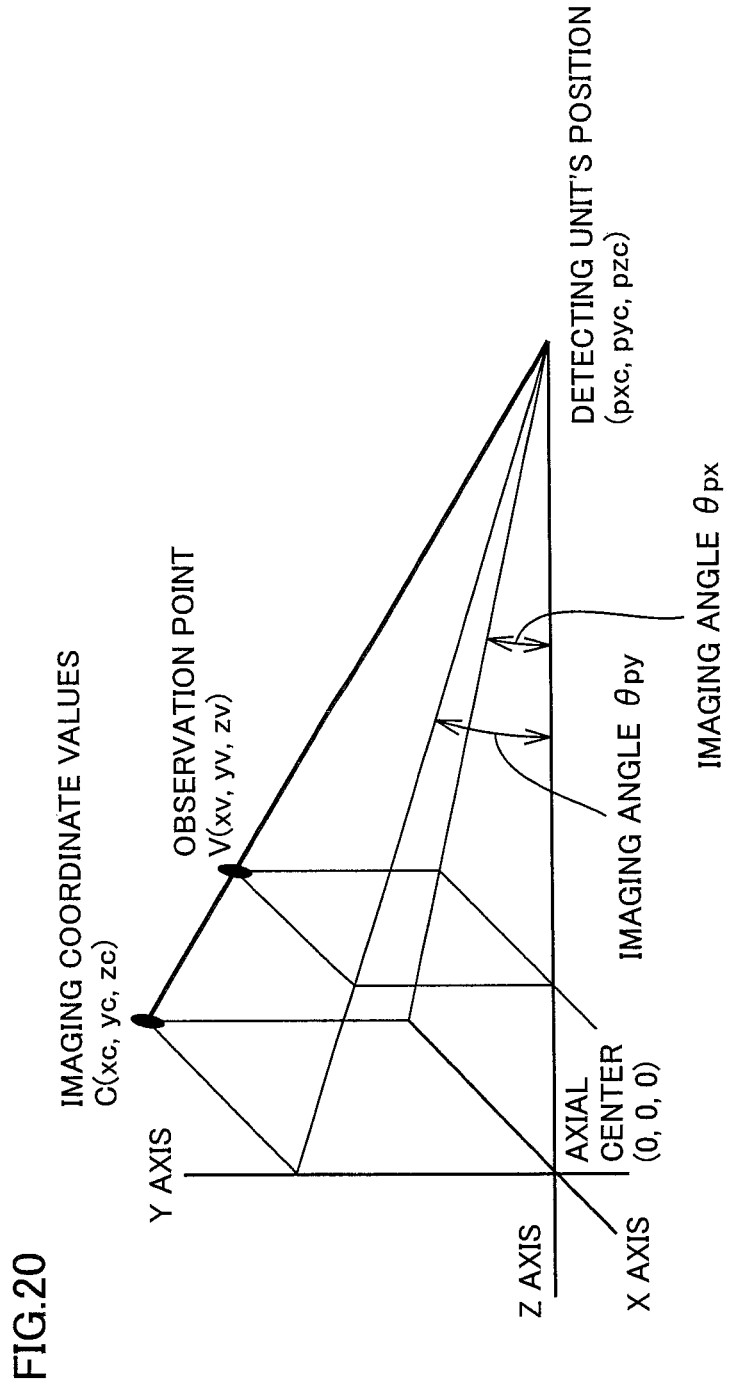
FIG. 20 is a diagram for explaining a process of calculating measurement imaging coordinate values shown in FIG. 15.

Next, the process of calculating the measurement imaging coordinate values shown in step S806 of FIG. 15 will be described. FIG. 20 is a diagram for explaining the process of calculating the measurement imaging coordinate values shown in FIG. 15.

Referring to FIG. 20, the imaging coordinate space is set so that its center is located at the axial center. The X coordinate plane and the Y coordinate plane are each a plane perpendicular to the corresponding rotational axis.

Imaging angles θpx and θpy of detecting unit 8 relative to observation point V are calculated in accordance with the following formulas.

$$\theta px = a \tan((pzc-zv)/xv)$$

$$\theta py = a \tan((pzc-zv)/yv)$$

The surface to be imaged by detecting unit 8 (imaging space coordinates) is supposed to be the X-Y plane where the z coordinate is 0. At this time, imaging coordinate values C (xc, yc, zc) on the surface to be imaged are calculated from imaging angles θpx and θpy in accordance with the following formulas.

$$xc = pzc \times \tan \theta px$$

$$yc = pzc \times \tan \theta py$$

$$zc = 0$$

The coordinates relative to the coordinates on detecting unit 8 are calculated in accordance with the following formulas.

$$px = xc \times (ccd\_x\_num/width)$$

$$py = yc \times (ccd\_y\_num/height)$$

It should be noted that ccd_x_num and ccd_y_num represent the number of lateral pixels and the number of vertical pixels of detecting unit 8 and "width" and "height" represent the lateral width and the vertical width respectively of the imaging range.

<<h5: Process of Acquiring and Process of Storing Measurement Value>>

Figure 21A:
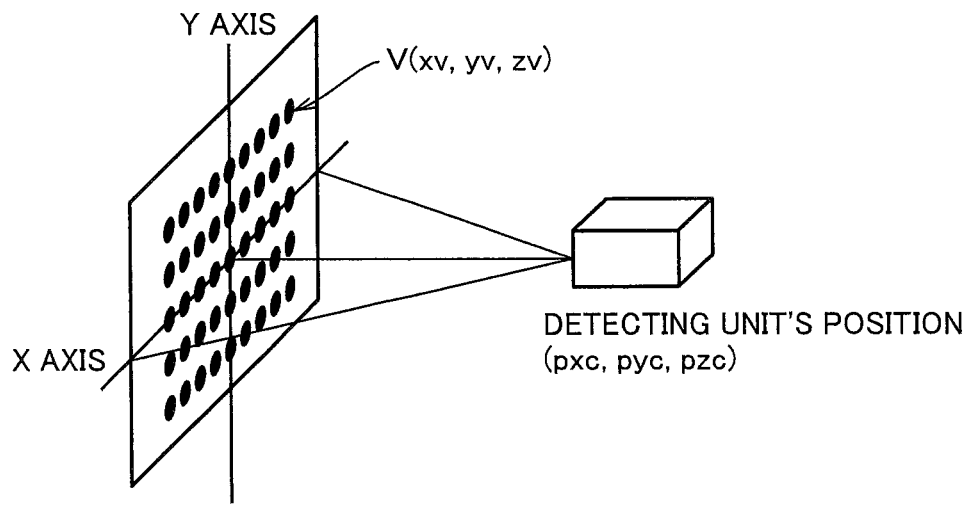
FIGS. 21A, 21B, and 22 are diagrams for explaining a process of acquiring and a process of storing a measurement value shown FIG. 15.
Figure 21B:
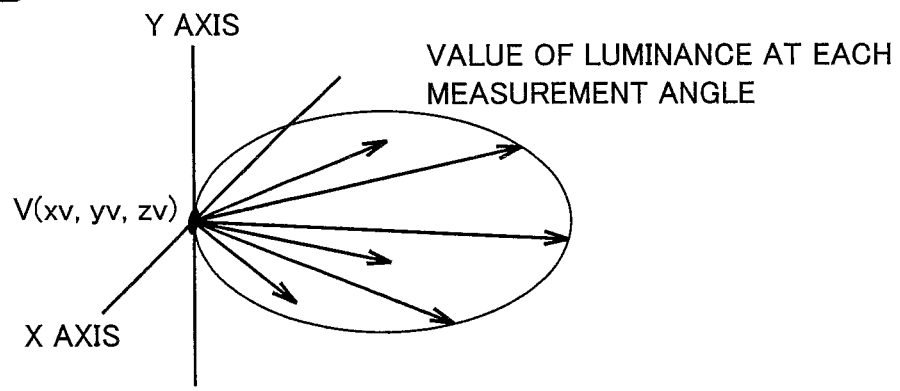
Figure 22:
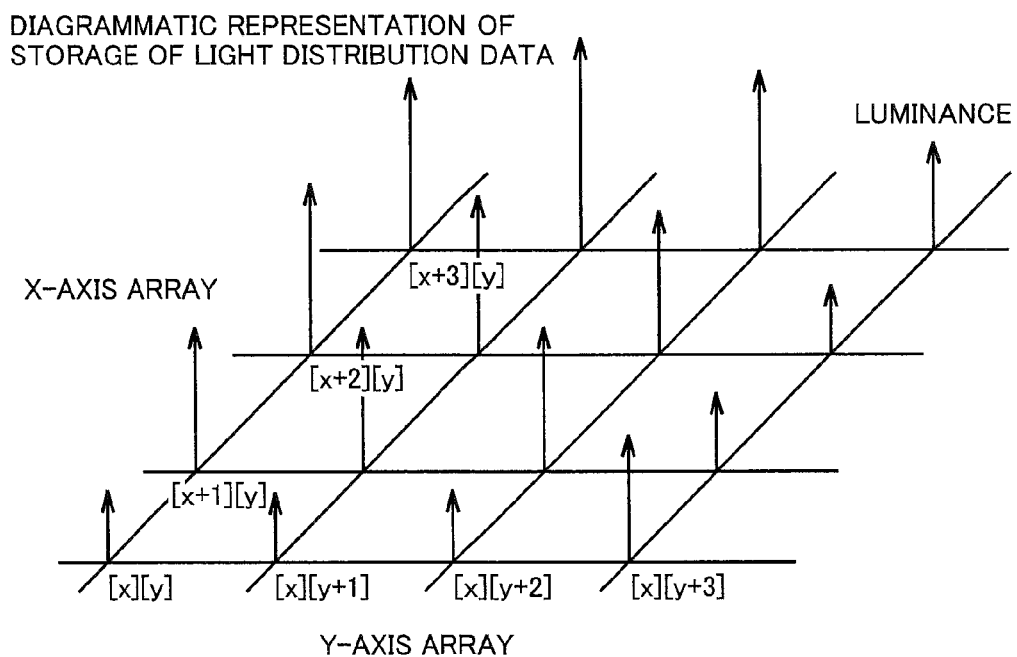

Next, the process of acquiring the measurement value shown in step S807 of FIG. 15 and the process of storing the measurement value shown in step S808 thereof will be described. FIGS. 21A, 21B, and 22 are diagrams for explaining the process of acquiring and the process of storing the measurement value shown in FIG. 15.

As shown in FIG. 21A, the luminance for each measurement angle is acquired for each observation point. This process of acquiring the luminance has been described above with reference to FIG. 16. Namely, a collection of luminance values at respective measurement angles is the luminance distribution data. As shown in FIG. 21B, the luminance at each measurement angle is acquired for each observation point. Namely, for each of a plurality of measurement angles corresponding to the number of observation points, the luminance is acquired. Thus, in the present embodiment, the light distribution characteristic is calculated at each of a plurality of observation points included in the imaging range of detecting unit 8.

For example, the array structure as shown in FIG. 22 is utilized to store each luminance associated with the measurement angle. Each luminance stored in this array structure is an element of the luminance distribution data. Namely, for each observation point, the luminance at a measurement angle (X-axis component and Y-axis component) is stored in the two-dimensional array. When the light source has a light distribution characteristic, the magnitude of the luminance varies depending on the measurement angle as shown in FIG. 22.

An arbitrary data storage method may be employed instead of the array structure as shown in FIG. 22.

<1. Illuminance Calculation Process>

Next, details of the illuminance calculation process shown in step S11 of FIGS. 13 and 14 will be described. In this illuminance calculation process, the light beam (luminance) from the light source that is incident on an illuminance-calculated position where the illuminance at this position is to be calculated is integrated in consideration of the light distribution characteristic of the light source to thereby calculate the illuminance at this position. Therefore, the observation point is identified that is a point from which emitted the light that is incident on the illuminance-calculated position and the process of integrating the luminance at this observation point is performed on which the angle of view of each observation point is reflected.

Figure 23:
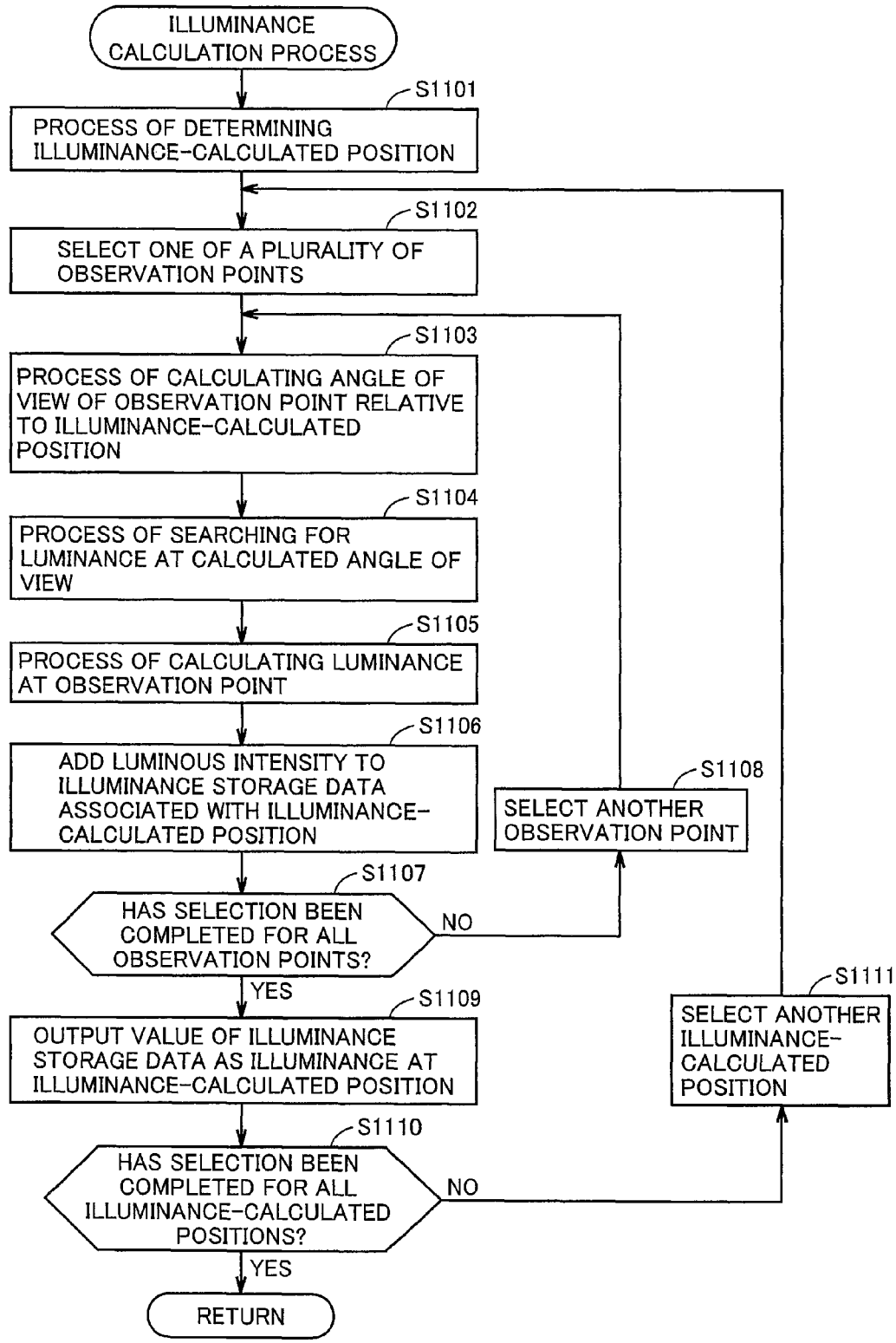
FIG. 23 is a flowchart showing a process procedure for an illuminance calculation process shown in step S11 of FIGS. 13 and 14.

FIG. 23 is a flowchart showing a process procedure for the illuminance calculation step shown in step S11 of FIGS. 13 and 14. Each step shown in FIG. 23 is mainly performed by CPU 101 of computer 100.

Referring to FIG. 23, CPU 101 of computer 100 performs the process of determining the illuminance-calculated position (step S1101). In this process of determining the illuminance-calculated position, CPU 101 sets any region (typically a wall surface) where the illuminance of this region should be calculated, determines one point which is included in this set region and which is to be the illuminance-calculated position, and acquires the space coordinates of this position.

Subsequently, CPU 101 of computer 100 selects any one observation point from a plurality of observation points for which the luminance distribution data has been acquired (step S1102). Subsequently, CPU 101 of computer 100 calculates, for the selected observation point, an angle of view of the observation point relative to the illuminance-calculated position (step S1103). Details of the process of calculating the angle of view will be described later herein.

Subsequently, CPU 101 of computer 100 searches the luminance distribution data associated with the selected observation point, for the luminance at the angle of view calculated in step S1103 (step S1104). Namely, the luminance corresponding to the calculated angle of view is searched for.

Subsequently, CPU 101 of computer 100 acquires the storage address where the luminance distribution data is stored in the vicinity of the calculated angle of view, and approximates the luminance included in the range of the searched light distribution data, to thereby calculate the luminance of the selected observation point (step S1105). Then, CPU 101 of computer 100 uses the luminous intensity correction factor to convert the calculated luminance to the luminous intensity, and adds the calculated luminous intensity to the illuminance storage data associated with the selected illuminance-calculated position (step S1106).

Then, CPU 101 of computer 100 determines whether or not the selection has been completed for all of a plurality of observation points for which the luminance distribution data has been acquired (step S1107). When any of a plurality of observation points has not been selected (NO in step S1107), CPU 101 selects another observation point (step S1108), and performs the processes from step S1103.

In contrast, when selection has been completed for all of a plurality of observation points (YES in step S1107), CPU 101 outputs the value of the illuminance storage data associated with the selected illuminance-calculated position, as the illuminance at this illuminance-calculated position (step S1109).

Namely, the process of adding the luminance (or the luminous intensity obtained by conversion) for all observation points is executed for one illuminance-calculated position. When the process of adding it to the illuminance storage data is completed for all of the observation points, the result of addition is the illuminance at the corresponding illuminance-calculated position.

The above series of processes is also performed for other illuminance-calculated positions. Namely, from the region where the illuminance should be calculated, illuminance-calculated positions are successively identified and the above-described processes are repeatedly performed. More specifically, CPU 101 of computer 100 determines whether or not the selection has been completed for all of a plurality of illuminance-calculated positions that are included in the region which has been set as a region where the illuminance should be calculated (step S1110). When any of a plurality of illuminance-calculated positions has not been selected (NO in step S1110), CPU 101 selects another illuminance-calculated position (step S1111), and performs the processes from step S1102.

In contrast, when all of a plurality of illuminance-calculated positions have been selected (YES in step S1110), the process returns.

<<i1: Process of Determining Illuminance-Calculated Position>>

Figure 24A:
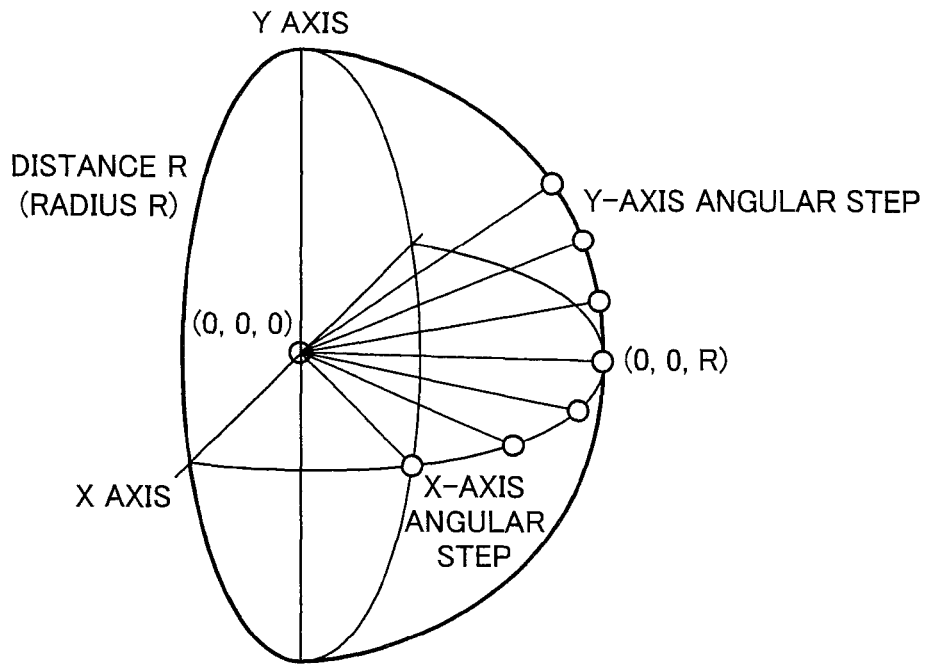
FIGS. 24A and 24B are diagrams for explaining a process of determining an illuminance-calculated position shown in FIG. 23.
Figure 24B:
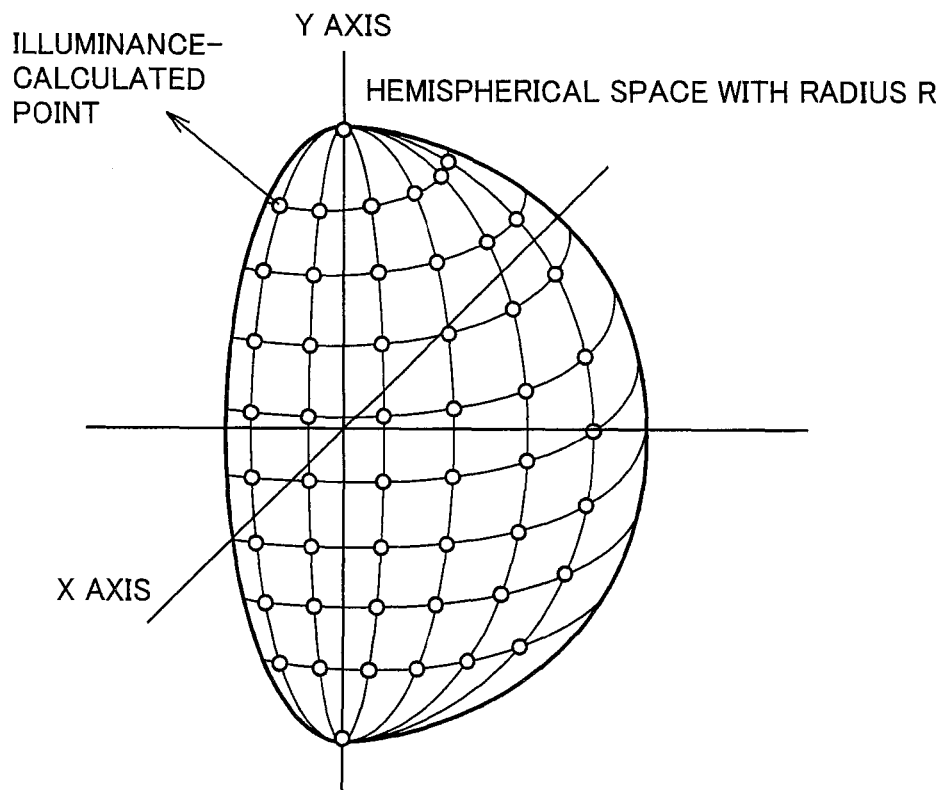

First, the process of determining the illuminance-calculated position shown in step S1101 of FIG. 23 will be described. FIGS. 24A and 24B are diagrams for explaining the process of determining the illuminance-calculated position shown in FIG. 23.

Referring to FIGS. 24A and 24B, generally the illuminance-calculated position is given by any of the X-Y coordinate system, the $\alpha$-$\beta$ coordinate system, and the $\phi$-$\theta$ coordinate system. FIG. 24A shows an example where a region in which the illuminance is to be calculated is defined by the X-Y coordinate system. The illuminance-calculated positions are set on this region. Typically, positions that are set at regular intervals by any of the coordinate systems are the illuminance-calculated positions. In the example shown in FIG. 24A, the illuminance-calculated positions are set at the intervals of X-axis steps and Y-axis steps. An example where the illuminance-calculated positions are set for the entire space is shown in FIG. 24B.

For the sake of convenience of calculation, the axial center is defined as the origin (0, 0, 0) of the space coordinate system, and space coordinate values representing the set illuminance-calculated position are determined.

<<i2: Process of Calculating Angle of View of Observation Point Relative to Illuminance-Calculated Position>>

Figure 25:
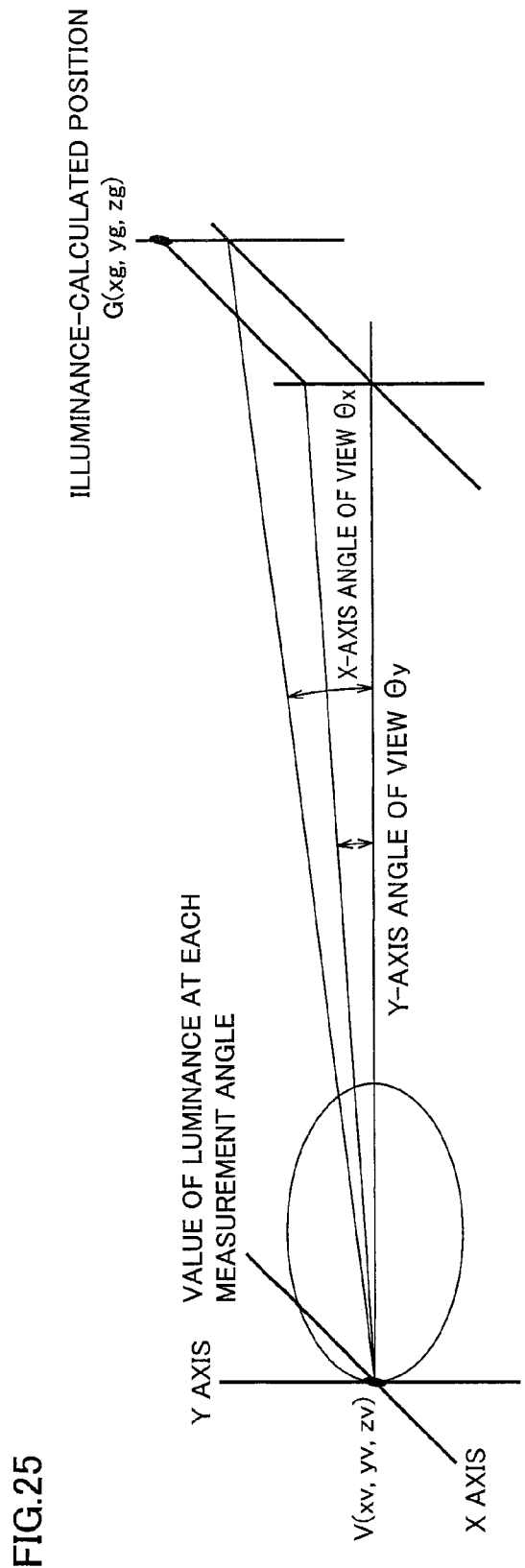
FIG. 25 is a diagram for explaining a process of calculating an angle of view of an observation point relative to the illuminance-calculated position shown in FIG. 23.

Next, a description will be given of the process of calculating the angle of view of the observation point relative to the illuminance-calculated position shown in step S1103 of FIG. 23. FIG. 25 is a diagram for explaining the process of calculating the angle of view of the observation point relative to the illuminance-calculated position shown in FIG. 23.

As shown in FIG. 25, it is supposed here that any one observation point V has coordinate values (xv, yv, zv) and an illuminance-calculated position G has coordinate values (xg, yg, zg). At this time, angles of view $\Theta x$, $\Theta y$ of observation point V relative to illuminance-calculated position G are as follows.

$$\Theta x = a \tan\{(xg-xv)/(zg-zv)\}$$

$$\Theta y = a \tan\{(yg-yv)/(zg-zv)\}$$

<<i3: Process of Searching for Luminance at Angle of View>>

Next, a description will be given of the process of searching for the luminance at the angle of view shown in step S1104 of FIG. 23. FIG. 26 is a diagram for explaining the process of searching for the luminance at the angle of view shown in FIG. 23.

The above-described array structure as shown in FIG. 22 is utilized to store each luminance associated with the measurement angle. Such an array structure is utilized to search for the storage addresses (angles of view θx, θy) in the light distribution data that are located around the intersection of angles of view Θx and Θy that correspond to the observation point relative to the illuminance-calculated position.

In the example shown in FIG. 26, four storage addresses (array positions 301, 302, 303, 304) adjacent to the intersection 300 of angle of view Θx and angle of view Θy on the two-dimensional array are searched for. Namely, it can be determined that the value of the illuminance in the range enclosed by these four addresses searched for is generated at the corresponding illuminance-calculated position.

<<i4: Process of Calculating Luminance at Observation Point>>

Figure 27A:
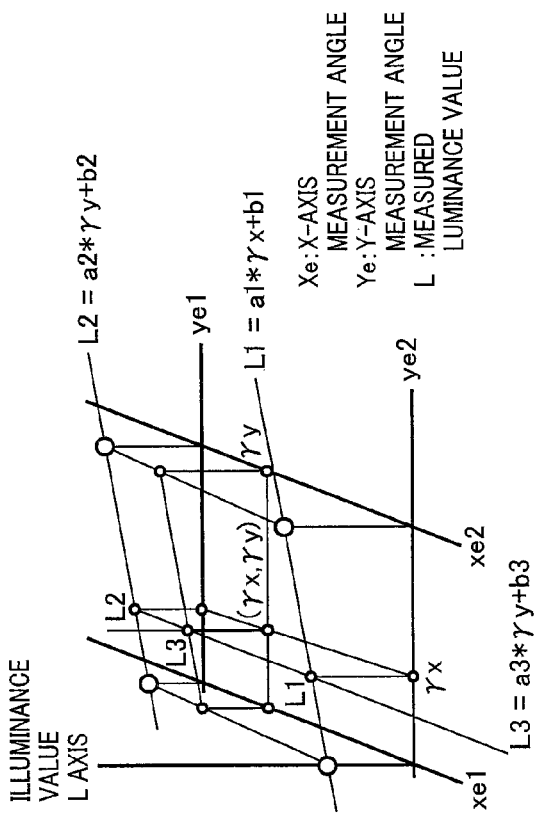
FIGS. 27A and 27B are diagrams for explaining a process of calculating the luminance at an observation point shown in FIG. 23.
Figure 27B:
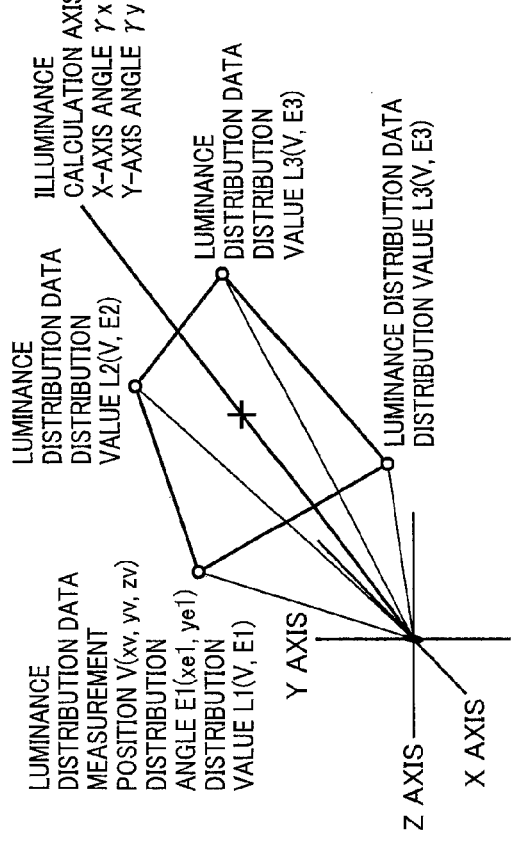

Next, a description will be given of the process of calculating the luminance at the observation point shown in step S1105 of FIG. 23. FIGS. 27A and 27B are diagrams for explaining the process of calculating the luminance at the observation point shown in FIG. 23.

As described above by means of above-referenced FIG. 26, based on the data stored at the storage addresses in the vicinity of the intersection of angles of view Θx and Θy of the observation point relative to the illuminance-calculated position, the luminance is calculated. For example, referring to FIG. 27A, for a luminance plane that is defined by the luminance corresponding to the light distribution angles (xe1, ye1), (xe2, ye1), (xe2, ye2), (xe1, ye2), the luminance corresponding to the illuminance calculation axis on the luminance plane is calculated. The illuminance calculation axis is defined as corresponding to angles of view Θx, Θy of the observation point relative to the illuminance-calculated position, and is defined by means of X-axis angle γx and Y-axis angle γy.

More specifically, as shown in FIG. 27B, linear interpolation is utilized to calculate the luminance at the illuminance-calculated position, from the adjacent luminance distribution data. In the example of FIG. 27B, a line passing through two points, namely luminance L (xe1, ye2) and (xe2, ye2) is defined as approximate line L1 (γx, ye2). Likewise, a line passing through two points, namely luminance L (xe1, ye1) and (xe2, ye1) is defined as approximate line L2 (γx, ye1). Further, from the line between approximate lines L1 and L2, an approximate line L3 (γx, γy) is determined. Then, the luminance corresponding to the angle of view (γx, γy) from the illuminance-calculated point is calculated.

<<i5: Process of Adding Luminous Intensity to Illuminance Storage Data>>

Figure 28:
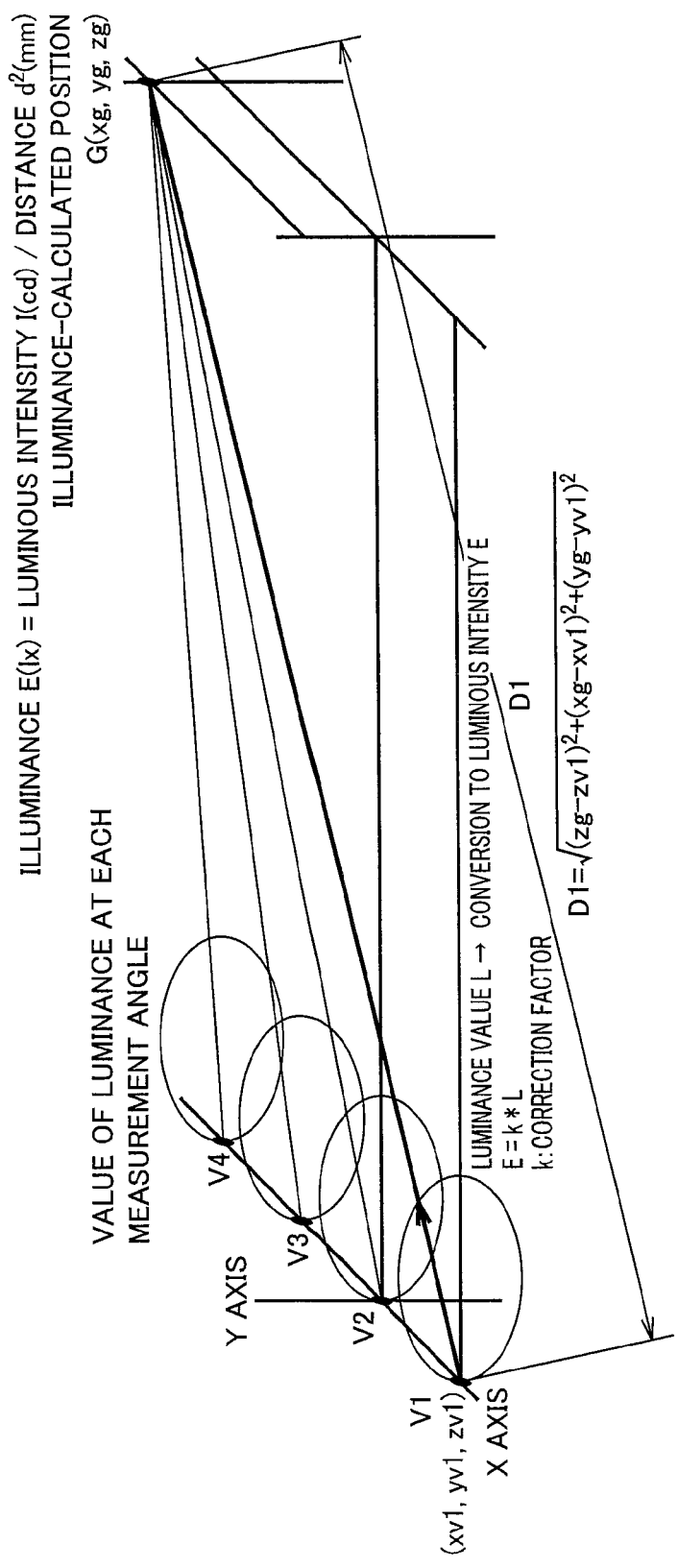
FIG. 28 is a diagram for explaining a process of adding the luminous intensity to illuminance storage data shown in FIG. 23.

Next, a description will be given of the process of adding the luminous intensity to the illuminance storage data shown in step S1106 of FIG. 23. FIG. 28 is a diagram for explaining the process of adding the luminous intensity to the illuminance storage data shown in FIG. 23. The illuminance at a certain illuminance-calculated position can be calculated as the integration of the intensity (luminous intensity) of light incident on the illuminance-calculated position.

First, CPU 101 uses luminous intensity correction factor k to convert luminance L at each observation point that has been calculated to luminous intensity I. Here, illuminance E is proportional to luminous intensity I and inversely proportional to the square of distance d from the light source. Thus, illuminance E from each observation point is calculated in accordance with the following formula.

Illuminance $E(lx)$=luminous intensity $I(cd)$/distance $d(mm)^2$

Distance d is calculated successively in accordance with illuminance-calculated position G (xg, yg, zg) and the coordinate values of each observation point.

The illuminance at the illuminance-calculated position is the integration of illuminance E from respective observation points. In this way, the illuminance at illuminance-calculated position G is calculated.

<J. Configuration where Multiple Detecting Units and Rotational Plane Mirror are Used>

Regarding the above-described light distribution characteristic measurement apparatus 1, the configuration where a single detecting unit 8 is used has been illustrated by way of example. Instead, a configuration where a plurality of detecting units 8 are used may be employed.

Figure 29:
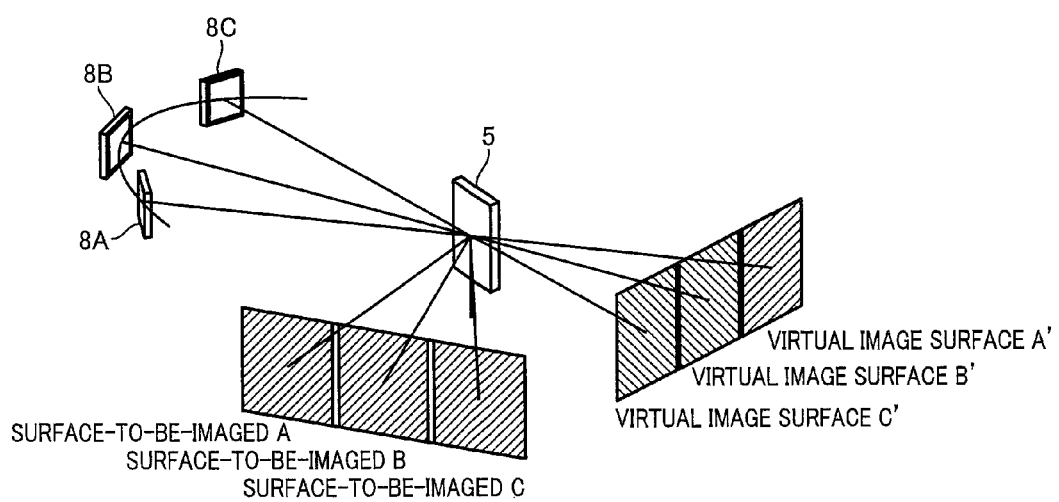
FIG. 29 is a schematic diagram showing main components of a light distribution characteristic measurement apparatus in a modification of the present embodiment.

FIG. 29 is a schematic diagram showing main components of a light distribution characteristic measurement apparatus in a modification of the present embodiment. Referring to FIG. 29, in the case where rotational plane mirror 5 is used and an object is imaged with a plurality of detecting units 8, respective imaging ranges of a plurality of detecting units 8A, 8B, 8C arranged laterally in accordance with a predetermined rule are surfaces-to-be-imaged A, B, C and accordingly virtual image surfaces A', B', and C' are generated. Namely, the detecting unit includes a plurality of detecting surfaces arranged in accordance with a predetermined rule, with respect to the rotational center of rotational plane mirror 5. Even when a plurality of detecting units 8 are thus set, rotational plane mirror 5 can be used to make the optical path longer and thereby expand the imaging range.

Figure 30:
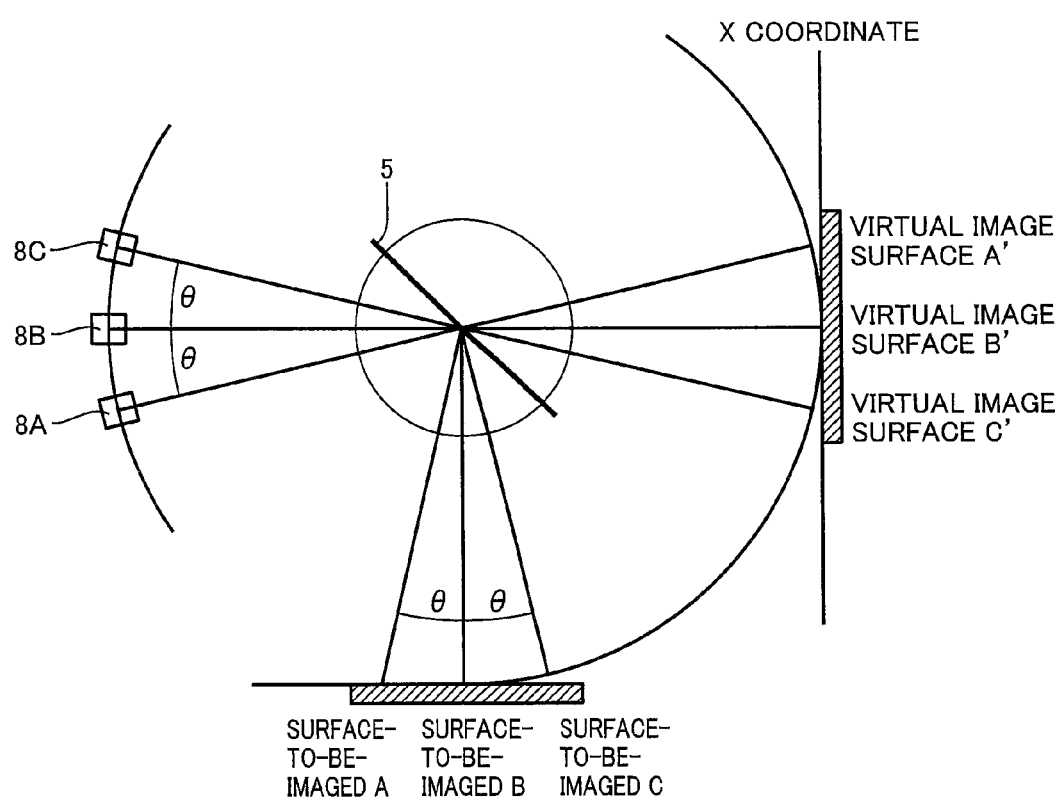
FIG. 30 is a diagram showing an example arrangement of detecting units in the light distribution characteristic measurement apparatus in the modification of the present embodiment.
Figure 31:
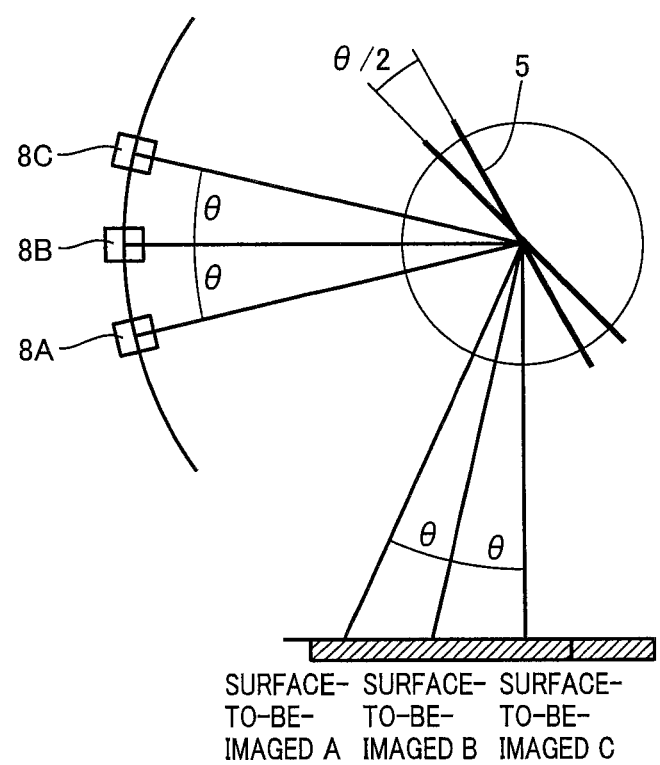
FIG. 31 is a diagram for explaining how an imaging range changes when a rotational plane mirror is oriented at the example arrangement shown in FIG. 30.

FIG. 30 is a diagram showing an example arrangement of detecting units 8A, 8B, 8C in the light distribution characteristic measurement apparatus in the modification of the present embodiment. FIG. 31 is a diagram for explaining how the imaging range changes when rotational plane mirror 5 is oriented at the example arrangement shown in FIG. 30.

Referring to FIG. 30, it is supposed that detecting units 8A, 8B, 8C are arranged so that they are separated from each other by angle θ. As shown in FIG. 31, rotation of rotational plane mirror 5 by rotational angle θ/2 at a time causes the imaging position to move by angle θ at a time. Namely, in the initial state shown in FIG. 30, the imaging range of detecting unit 8A is surface-to-be-imaged A, the imaging range of detecting unit 8B is surface-to-be-imaged B, and the imaging range of detecting unit 8C is surface-to-be-imaged C. With respect to this state, rotational plane mirror 5 is rotated by θ/2. Then, as shown in FIG. 31, surfaces-to-be-imaged A, B, C are all moved leftward in the plane of FIG. 31. Namely, CPU 101 of computer 100 rotates rotational plane mirror 5 by an angle (θ/2) at each movement that is a half of the angle (θ) formed by two adjacent detecting surfaces with respect to the rotational center of rotational plane mirror 5.

At this time, surface-to-be-imaged B of detecting unit 8B after the rotation is the same as surface-to-be-imaged A of detecting unit 8A before the rotation. Likewise, surface-to-be-imaged C of detecting unit 8C after the rotation is the same as surface-to-be-imaged B of detecting unit 8B before the rotation. Detecting units 8A, 8B, 8C are identical to each other in terms of the angle of view with respect to the same observation point. This rotation of rotational plane mirror 5 and imaging are repeated to thereby image the same surface-to-be-imaged by a plurality of detecting units 8. Accordingly, each of a plurality of detecting units 8 can acquire image data about the same surface-to-be-imaged.

A plurality of detecting units 8 can perform imaging with respective imaging ranges identical to each other, respective optical paths identical to each other, and respective angles of view for a common observation point that are identical to each other. Through the use of rotational plane mirror 5, a plurality of detecting units 8 (typically cameras) can be used to image a common object on the same optical path. Imaging can thus be performed to allow detecting units 8 to have the same angle of view relative to a common observation point, and therefore, image processing can be performed using a plurality of image data for any observation point (certain point on the surface of the light source). A typical example of such image processing, specifically a method for calculating the chromaticity by means of a plurality of detecting units 8 and rotational plane mirror 5 will be described.

FIG. 32 is a diagram for explaining an example configuration where the chromaticity is calculated by means of a light distribution characteristic measurement apparatus in a modification of the present embodiment. As described above, a plurality of detecting units 8A, 8B, 8C and rotational plane mirror 5 can be used to acquire a plurality of image data obtained through imaging of a specific surface-to-be-imaged, by a plurality of detecting units 8A, 8B, 8C, respectively.

Here, a plurality of detecting units 8 can be mounted with respective chromaticity filters or wavelength filters different from each other, to thereby calculate the chromaticity characteristics or wavelength characteristics of a surface-to-be-imaged. As shown in FIG. 32, it is supposed for example that detecting units 8A, 8B, 8C are mounted with respective chromaticity filters different from each other, and image the same object. Specifically, it is supposed that detecting unit 8A is mounted with a filter for chromaticity X, detecting unit 8B is mounted with a filter for chromaticity Y, and detecting unit 8C is mounted with a filter for chromaticity Z. Light intensity data at specific coordinates (x, y) on the image data obtained through respective imaging operations of detecting units 8A, 8B, 8C are each expressed in the following manner:

light intensity at coordinates (x, y) of the image data obtained by detecting unit 8A: $A(x, y)$;
light intensity at coordinates (x, y) of the image data obtained by detecting unit 8B: $B(x, y)$; and
light intensity at coordinates (x, y) of the image data obtained by detecting unit 8C: $C(x, y)$.

Here, light intensity: $A(x, y)$ corresponds to chromaticity X data, light intensity: $B(x, y)$ corresponds to chromaticity Y data, and light intensity: $C(x, y)$ corresponds to chromaticity Z data.

These data can be used to calculate chromaticity x as follows.

$$\text{Chromaticity } x = A(x, y)/(A(x, y)+B(x, y)+C(x, y))$$

The methods for calculating the angle of view and the observation point are similar to those for the case where one detecting unit 8 is used. Such a process of calculating the chromaticity is advantageous in the case where the viewing angle characteristics of a display or the like are measured.

<K. Other Embodiments>

While above-referenced FIGS. 7 and 9 show the configuration where rotational plane mirror 5 is rotated about the axis in the vertical direction in the plane of FIGS. 7 and 9, the mirror may be rotated about the axis in the lateral direction in the plane of FIGS. 7 and 9. Further, rotational plane mirror 5 may be rotated about the two axes independently of each other. The increased number of rotational axes can further expand the imaging range.

<L. Advantages>

The light distribution characteristic measurement apparatus in the present embodiment employs a configuration where the light emitted from light source 10 is reflected (folded back) by rotational plane mirror 5 and directed to detecting unit 8. Such a configuration can be employed to shorten the distance from light source 10 to detecting unit 8. Accordingly, it is unnecessary to lengthen the distance from the rotational axis (central axis) to rotational plane mirror 5, and the radius of rotation of detecting unit 8 and rotational plane mirror 5 can be shortened. Thus, the apparatus can be reduced in size and weight to a greater extent.

Moreover, in the light distribution characteristic measurement apparatus in the present embodiment, the radius of rotation of rotational plane mirror 5 can be shortened, and therefore, the structure of support 3 and arm 4 involved in the rotational driving can be simplified and reduced in weight. Further, since detecting unit 8 can be placed near the rotational axis (central axis), the moment involved in the rotational driving can be reduced, and therefore, the structure of support 3 and arm 4 can be reduced in weight to a greater extent. Accordingly, the rotational speed of detecting unit 8 and rotational plane mirror 5 can be made higher and thus the time required for measurement can be shortened. At this time, two mirrors can be used to make the light unpolarized that is to be input from light source 10 to detecting unit 8.

Further, in the light distribution characteristic measurement apparatus in the present embodiment, rotational plane mirror 5 can be rotated to expand the imaging range of detecting unit 8. In the case where a line sensor is used as detecting unit 8, imaging is performed while rotational plane mirror 5 is rotated about its rotational axis in accordance with the size of the light emission surface of light source 10. Therefore, it is unnecessary to adjust the picture angle of detecting unit 8 by means of lens 7 or the like depending on the size of the light emission surface of light source 10. Namely, it is only necessary to adjust the range of the rotational angle of rotational plane mirror 5 depending on the size of the light emission surface of light source 10, and therefore, it is easy to measure the light distribution characteristic of a variety of light sources 10.

Furthermore, in the light distribution characteristic measurement apparatus in the present embodiment, a plurality of detecting units may be arranged. In this case, at the same angle of view with respect to light source 10, each of a plurality of detecting units can image the same observation point. Accordingly, calculation of the chromaticity or the like can be made in a short time. At this time, a plurality of detecting units can perform imaging in parallel, which can therefore shorten the time required for measurement.

The foregoing description will make evident the advantages other than the above ones of the light distribution characteristic measurement apparatus in the present embodiment.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A light distribution characteristic measurement apparatus for measuring a light distribution characteristic of a light source, comprising:
  a detecting unit for detecting light from the light source;
  a mirror for reflecting the light from the light source to direct the light to the detecting unit;
  a movement mechanism for moving the detecting unit and the mirror relatively to the light source;

a rotation mechanism for rotating the mirror while maintaining an optical path length from the light source to the detecting unit; and a processor adapted to calculate the light distribution characteristic of the light source, based on a plurality of measurement results that are detected by the detecting unit under a condition that the detecting unit and the mirror are arranged at a plurality of measurement positions relative to the light source and the mirror is oriented at different rotational angles for each measurement position, wherein the detecting unit includes a plurality of detecting surfaces arranged in accordance with a predetermined rule, with respect to a rotational center of the mirror.

2. The light distribution characteristic measurement apparatus according to claim 1, wherein the rotation mechanism is adapted to control the rotational angle of the mirror so that a field of view of the detecting unit when the mirror is oriented at a first rotational angle and a field of view of the detecting unit when the mirror is oriented at a second rotational angle do not overlap each other.

3. The light distribution characteristic measurement apparatus according to claim 1, wherein the processor is adapted to calculate an angle of view of the detecting unit with respect to the light source, in connection with the rotational angle of the mirror.

4. The light distribution characteristic measurement apparatus according to claim 1, further comprising a lens for adjusting a focal point of the detecting unit on a light emission surface of the light source.

5. The light distribution characteristic measurement apparatus according to claim 1, wherein the detecting unit and the mirror are configured to be rotatable integrally with each other about a first axis and a second axis whose intersection corresponds to the center of the light source, and the rotation mechanism is adapted to rotate the mirror about an axis at least parallel to one of the first and second axes.

6. The light distribution characteristic measurement apparatus according to claim 1, further comprising a second mirror placed on an optical path from the mirror to the detecting unit.

7. The light distribution characteristic measurement apparatus according to claim 1, wherein the rotation mechanism is adapted to rotate the mirror by an angle at each movement that is a half of an angle formed by two adjacent detecting surfaces with respect to the rotational center of the mirror.

8. A light distribution characteristic measurement method for measuring a light distribution characteristic of a light source, comprising:

moving a detecting unit for detecting light from the light source and a mirror for reflecting the light from the light source to direct the light to the detecting unit, relatively to the light source, to arrange the detecting unit and the mirror at a plurality of measurement positions relative to the light source;

orienting the mirror at different rotational angles for each measurement position while maintaining an optical path length from the light source to the detecting unit; and calculating the light distribution characteristic of the light source, based on a plurality of measurement results detected by the detecting unit, wherein the detecting unit includes a plurality of detecting surfaces arranged in accordance with a predetermined rule, with respect to a rotational center of the mirror.

9. The light distribution characteristic measurement method according to claim 8, wherein the step of rotating includes controlling the rotational angle of the mirror so that a field of view of the detecting unit when the mirror is oriented at a first rotational angle and a field of view of the detecting unit when the mirror is oriented at a second rotational angle do not overlap each other.

10. The light distribution characteristic measurement method according to claim 8, wherein the step of calculating includes calculating an angle of view of the detecting unit with respect to the light source, in connection with a rotational angle of the mirror.

11. The light distribution characteristic measurement method according to claim 8, wherein the detecting unit and the mirror are configured to be rotatable integrally with each other about a first axis and a second axis whose intersection corresponds to the center of the light source, and the step of rotating includes rotating the mirror about an axis at least parallel to one of the first axis and second axes.

12. The light distribution characteristic measurement method according to claim 8, wherein the step of rotating includes rotating the mirror by an angle at each movement that is a half of an angle formed by two adjacent detecting surfaces with respect to the rotational center of the mirror.

* * * * *